(12) United States Patent
Gray et al.

(10) Patent No.: US 6,759,159 B1
(45) Date of Patent: Jul. 6, 2004

(54) SYNTHETIC JET FOR ADMITTING AND EXPELLING REACTANT AIR

(75) Inventors: Gary Edward Gray, Marietta, GA (US); John Douglas Witzigreuter, Kennesaw, GA (US); Christopher Steven Pedicini, Roswell, GA (US)

(73) Assignee: The Gillette Company, Boston, MA (US)

( * ) Notice: Subject to any disclaimer, the term of this patent is extended or adjusted under 35 U.S.C. 154(b) by 116 days.

(21) Appl. No.: 09/593,343

(22) Filed: Jun. 14, 2000

(51) Int. Cl.⁷ ................................. H01M 2/12
(52) U.S. Cl. ...................... 429/71; 429/27; 429/83
(58) Field of Search .............. 429/27, 28, 29, 429/71, 82, 83

(56) References Cited

U.S. PATENT DOCUMENTS

| | | |
|---|---|---|
| 737,613 A | 9/1903 | Halsey |
| 1,510,617 A | 10/1924 | Vare |
| 2,027,310 A | 1/1936 | Smith |
| 2,176,657 A | 10/1939 | Finch |
| 2,468,430 A | 4/1949 | Derksen |
| 3,160,528 A | 12/1964 | Dengler et al. |
| 3,629,009 A | 12/1971 | Bennett |
| 3,871,920 A | 3/1975 | Grebier et al. |
| 3,909,302 A | 9/1975 | Mermelstein |
| 3,963,519 A | 6/1976 | Louie |
| 3,975,210 A | 8/1976 | Warnock |
| 4,052,534 A | 10/1977 | Devitt |
| 4,060,670 A | 11/1977 | Tamminen |
| 4,063,826 A | 12/1977 | Riepe |
| 4,112,198 A | 9/1978 | Przybyla et al. |
| 4,118,544 A | 10/1978 | Przybyla et al. |
| 4,139,679 A | 2/1979 | Appleby et al. |
| 4,177,327 A | 12/1979 | Mathews et al. |
| 4,180,624 A | 12/1979 | Winsel |
| 4,189,526 A | 2/1980 | Cretzmeyer et al. |
| 4,211,830 A | 7/1980 | Chevet |
| 4,221,644 A | 9/1980 | LaBarre |
| 4,262,062 A | 4/1981 | Zatsky |
| 4,269,906 A | 5/1981 | Schmechtig |
| 4,310,604 A | 1/1982 | Marchetti |
| 4,400,447 A | 8/1983 | Gerenser et al. |
| 4,450,211 A | 5/1984 | Vignaud |
| 4,505,996 A | 3/1985 | Simonton |
| 4,517,259 A | 5/1985 | Lance |
| 4,521,497 A | 6/1985 | Tamminen |
| 4,525,439 A | 6/1985 | Simonton |
| 4,554,226 A | 11/1985 | Simonton |
| 4,560,626 A | 12/1985 | Joy |
| 4,626,482 A | 12/1986 | Hamlen et al. |
| 4,640,874 A | 2/1987 | Kelm |
| 4,648,807 A | 3/1987 | Tippetts et al. |
| 4,649,090 A | 3/1987 | Oltman et al. |

(List continued on next page.)

FOREIGN PATENT DOCUMENTS

| | | |
|---|---|---|
| DE | 2040 346 | 2/1972 |
| DE | 195 48297 A1 | 6/1997 |
| EP | 0 044 060 A2 | 7/1981 |

(List continued on next page.)

OTHER PUBLICATIONS

U.S. patent application Ser. No. 09/215,879, Tinker et al., filed Dec. 18, 1998.
U.S. patent application Ser. No. 09/574,154, Tinker et al., filed May 18, 2000.

*Primary Examiner*—Stephen Kalafut

(57) ABSTRACT

The present invention relates to a synthetic air jet for a metal-air battery. A synthetic air jet can be housed within, incorporated into, or attached to a battery casing to generate a convective air flow for an air cathode of a metal-air cell contained within the casing. A means for activating the synthetic air jet controls the air flow through the battery casing. When the synthetic air jet is activated, the internal volume of the synthetic air jet changes. The expansion and contraction of the synthetic air jet creates an air flow through the battery, thus providing reactant air for the air cathode of the metal-air cell.

51 Claims, 13 Drawing Sheets

U.S. PATENT DOCUMENTS

| | | |
|---|---|---|
| 4,687,714 A | 8/1987 | Oltman et al. |
| 4,816,354 A | 3/1989 | Tamminen |
| 4,855,195 A | 8/1989 | Georgopoulos et al. |
| 4,857,885 A | 8/1989 | Umerez |
| 4,894,295 A | 1/1990 | Cheiky |
| 4,908,281 A | 3/1990 | O'Callaghan |
| 4,913,983 A | 4/1990 | Cheiky |
| 4,938,742 A | 7/1990 | Smits |
| 4,943,750 A | 7/1990 | Howe et al. |
| 4,950,561 A | 8/1990 | Niksa et al. |
| 5,011,380 A | 4/1991 | Kovacs |
| 5,066,204 A | 11/1991 | Point et al. |
| 5,069,986 A | 12/1991 | Dworkin et al. |
| 5,085,562 A | 2/1992 | van Lintel |
| 5,183,222 A | 2/1993 | Ramsey, Jr. |
| 5,191,274 A | 3/1993 | Lloyd et al. |
| 5,213,910 A | 5/1993 | Yamada |
| 5,258,239 A | 11/1993 | Kobayashi |
| 5,304,431 A | 4/1994 | Schumm, Jr. |
| 5,325,880 A | 7/1994 | Johnson et al. |
| 5,328,777 A | 7/1994 | Bentz et al. |
| 5,354,625 A | 10/1994 | Bentz et al. |
| 5,356,729 A | 10/1994 | Pedicini |
| 5,362,577 A | 11/1994 | Pedicini |
| 5,387,477 A | 2/1995 | Cheiky |
| 5,398,011 A | 3/1995 | Kimura et al. |
| 5,411,644 A | 5/1995 | Neukermans |
| 5,417,235 A | 5/1995 | Wise et al. |
| 5,429,885 A | 7/1995 | Stockburger et al. |
| 5,434,016 A | 7/1995 | Benz et al. |
| 5,439,758 A | 8/1995 | Stone et al. |
| 5,449,569 A | 9/1995 | Schumm, Jr. |
| 5,458,505 A | 10/1995 | Prager |
| 5,486,429 A | 1/1996 | Thibault |
| 5,506,067 A | 4/1996 | Tinker |
| 5,529,465 A | 6/1996 | Zengerle et al. |
| 5,532,086 A | 7/1996 | Thibault et al. |
| 5,536,590 A | 7/1996 | Cheiky |
| 5,560,999 A | 10/1996 | Pedicini et al. |
| 5,563,004 A | 10/1996 | Buzzelli et al. |
| 5,567,284 A | 10/1996 | Bauer et al. |
| 5,569,551 A | 10/1996 | Pedicini et al. |
| 5,571,630 A | 11/1996 | Cheiky |
| 5,619,177 A | 4/1997 | Johnson et al. |
| 5,622,482 A | 4/1997 | Lee |
| 5,639,568 A | 6/1997 | Pedicini et al. |
| 5,641,585 A | 6/1997 | Lessing et al. |
| 5,641,588 A | 6/1997 | Sieminski et al. |
| 5,645,952 A | 7/1997 | Lampinen et al. |
| 5,650,241 A | 7/1997 | McGee |
| 5,665,481 A | 9/1997 | Shuster et al. |
| 5,691,074 A | 11/1997 | Pedicini |
| 5,691,075 A | 11/1997 | Batawi |
| 5,712,052 A | 1/1998 | Kawatsu |
| 5,721,064 A | 2/1998 | Pedicini et al. |
| 5,730,587 A | 3/1998 | Snyder et al. |
| 5,733,677 A | 3/1998 | Golovin et al. |
| 5,753,384 A | 5/1998 | Kimberg |
| 5,758,823 A | 6/1998 | Glezer et al. |
| 5,776,625 A | 7/1998 | Kaufman et al. |
| 5,786,980 A | 7/1998 | Evans |
| 5,837,394 A | 11/1998 | Schumm, Jr. |
| 5,861,703 A | 1/1999 | Losinski |
| 5,888,664 A | 3/1999 | Sieminski et al. |
| 5,916,704 A | 6/1999 | Lewin et al. |
| 5,919,582 A | 7/1999 | Pedicini et al. |
| 6,033,191 A | 3/2000 | Kamper et al. |
| 6,059,583 A | 5/2000 | Croft et al. |
| 6,068,944 A | 5/2000 | Witzigreuter |
| 6,087,029 A * | 7/2000 | Golovin et al. ............... 429/27 |

FOREIGN PATENT DOCUMENTS

| | | | |
|---|---|---|---|
| EP | 0311275 A2 | 12/1989 | |
| EP | 0311275 B1 | 11/1992 | |
| EP | 0744784 A1 | 11/1996 | |
| GB | 1221196 | 2/1971 | |
| GB | 1317214 * | 5/1973 | .......... H01M/29/02 |
| JP | 10-148181 | 6/1996 | |
| WO | WO93/19495 | 9/1993 | |
| WO | WO94/02966 | 2/1994 | |
| WO | WO94/08358 | 4/1994 | |
| WO | WO94/25991 | 11/1994 | |
| WO | WO94/29924 | 12/1994 | |
| WO | WO96/07209 | 3/1996 | |
| WO | WO96/09656 | 3/1996 | |
| WO | WO97/15090 | 4/1997 | |
| WO | WO97/44848 | 11/1997 | |
| WO | WO99/16145 | 4/1999 | |
| WO | WO 00/36694 | 6/2000 | |

\* cited by examiner

SYNTHETIC JET FOR ADMITTING AND EXPELLING REACTANT AIR

TECHNICAL FIELD

The present invention relates generally to batteries and electrochemical cells, and relates more specifically to an air mover system with a synthetic air jet for metal-air electrochemical cells.

BACKGROUND OF THE INVENTION

Generally described, a metal-air cell, such as a zinc-air cell, uses one or more air permeable cathodes separated from a metallic zinc anode by an aqueous electrolyte. During operation of the cell, oxygen from the ambient air is converted at the one or more cathodes to produce hydroxide ions. The metallic zinc anode is then oxidized by the hydroxide ions. Water and electrons are released in this electrochemical reaction to provide electrical power.

Initially, metal-air cells found limited commercial use in devices, such as hearing aids, which required a low level of power. In these cells, the air openings which admitted air to the air cathode were so small that the cells could operate for some time without flooding or drying out as a result of the typical difference between the outside relative humidity and the water vapor pressure within the cell. However, the power output of such cells was too low to operate devices such as camcorders, cellular phones, or laptop computers. Furthermore, enlarging the air openings of a typical "button cell" was not practical because it would lead to premature failure as a result of flooding or drying out.

In order to increase the power output of metal-air cells so that they could be used to operate devices such as camcorders, cellular phones, or laptop computers, air managers were developed with a view to providing a flow of reactive air to the air cathodes of one or more metal-air cells while isolating the cells from environmental air and humidity when no output is required. As compared to conventional electrochemical power sources, metal-air cells containing air managers provide relatively high power output and long lifetime with relatively low weight. These advantages are due in part to the fact that metal-air cells utilize oxygen from the ambient air as the reactant in the electrochemical process as opposed to a heavier material such as a metal or a metallic composition. Examples of air managers are shown in U.S. Pat. Nos. 4,913,983 and 5,356,729. An example of an advanced system for isolating a metal-air cell is U.S. Pat. No. 5,691,074.

A disadvantage of most air managers, however, is that they utilize an air moving device, typically a fan or an air pump, that occupies space that could otherwise be used for battery chemistry to prolong the life of the battery. This loss of space presents a particular challenge in attempts to provide a practical metal-air cell in small enclosures such as the "AA" cylindrical size now used as a standard in many electronic devices.

In addition to being bulky, air moving devices used in metal-air batteries also consume energy stored in the metal-air cells that might otherwise be delivered as power output to a load. Complicated electronics for controlling an air manager can increase this use of stored energy. Also, as most air moving devices used in metal-air cells distribute air to a cathode plenum at low pressure, a flow path must be defined passing over all regions of the cathode surface to evenly distribute air to the entire cathode surface. Thus, the function of bringing in make up air and the function of mixing and distributing air within the battery have been separate. A further disadvantage of fans used as air moving devices in metal-air cells is that they may create noise at a level disruptive to users of devices such as cellular telephones.

As a result, while a key advantage of metal-air cells is their high energy density resulting from the low weight of the air electrode, this advantage is compromised by the space and power required for an effective air manager, and the noise it may produce.

Therefore, there has been a need in the art for an air manager incorporating an air moving device that occupies less of the volume available for battery chemistry, is usable with advanced systems for isolating the air electrodes when power is not being drawn from the metal-air cell, is quiet, does not require a complex baffle system in the cathode air plenum to distribute the air, needs relatively simple controls, and consumes power at a relatively low rate.

SUMMARY OF THE INVENTION

The present invention seeks to solves the problems described above. The present invention seeks to provide an air moving device that occupies less volume than conventional air movers, is usable with advanced systems for isolating air electrodes, does not require a complex baffle system for distributing air throughout the cathode air plenum, is quiet, and needs relatively simple controls, and consumes power at a relatively low rate.

These objects are accomplished according to the present invention in an air manager for a metal-air battery, comprising a synthetic air jet and a metal-air cell in a battery casing. The battery casing has an inlet and an outlet to permit air to flow into and out of the casing. The synthetic air jet has a housing with an internal cavity, and an opening into the housing to permit air to flow into the housing and to flow out of the housing. A movable member changes the internal volume of the synthetic air jet housing allowing ambient air to enter the inlet into the battery casing, and enter through the opening into the synthetic jet housing. The air is then expelled through the opening out of the housing into the casing, and at least some of the air escapes out of the casing through the outlet to the ambient air outside the casing. Along its path, the air passes adjacent to an air electrode of the metal-air cell.

In one preferred embodiment, diffusion isolation tubes extending either inside or outside the battery casing can connect to the casing inlet and the casing outlet to help regulate the air flow and the moisture exposure of the metal-air cell.

The movable member can be a flexible diaphragm incorporated into the housing of the synthetic air jet. The flexible diaphragm can be made from metal or can incorporate metal. Then the internal volume of the synthetic air jet can be varied with an electrode activated to attract and/or repel the diaphragm. Control of the air flow through the battery casing is regulated by controlling the rate of change of the internal volume of the synthetic air jet.

In another embodiment, a piston can be incorporated into the housing of a synthetic air jet to change the internal volume of the synthetic air jet using any conventional drive mechanism for actuating a piston.

More particularly describing a preferred embodiment, a synthetic air mover for a metal-air battery comprises a casing with an inlet and an outlet. A metal-air cell comprising an anode and a cathode are also located within the casing. A synthetic air jet located inside the casing draws air from outside the casing through the inlet. The air passes through the inlet into the casing and across the cathode. The air is then expelled by the synthetic air jet through the outlet out of the casing. A means for activating the synthetic air jet controls and regulates the air flow through the battery casing. Diffusion isolation tubes extending either inside or outside the battery casing can connect to the casing inlet and the casing outlet to help regulate the air flow and the moisture exposure of the metal-air cell.

In yet another aspect of the invention, a synthetic air jet for a metal-air battery can be positioned inside different sized casings, such as prismatic or cylindrical casings. In any sized casing, the synthetic air jet should admit sufficient quantities of air into the casing to supply an air electrode of the metal-air battery.

Other objects, features, and advantages of the present invention will become apparent upon reading the following specification, when taken in conjunction with the drawings and the appended claims.

DETAILED DESCRIPTION OF INVENTION EMBODIMENTS

The invention may be embodied in a metal-air battery. It is well understood that many types of electrical devices may be powered by a metal-air battery. The cells of the metal-air battery may be similar to those disclosed in commonly owned Ser. No. 08/299,997, now U.S. Pat. No. 5,641,588, or in commonly owned U.S. Pat. No. 5,356,729 or 5,641,588 or 5,569,551, which are incorporated herein by reference. The metal-air battery may include a plurality of metal-air cells enclosed within a casing. Although the use of the invention with specific types of metal-air cells is disclosed, this invention should be understood as being applicable to any type of metal-air cell, whether primary or secondary.

First Embodiment of the Present Invention

Figure 1:
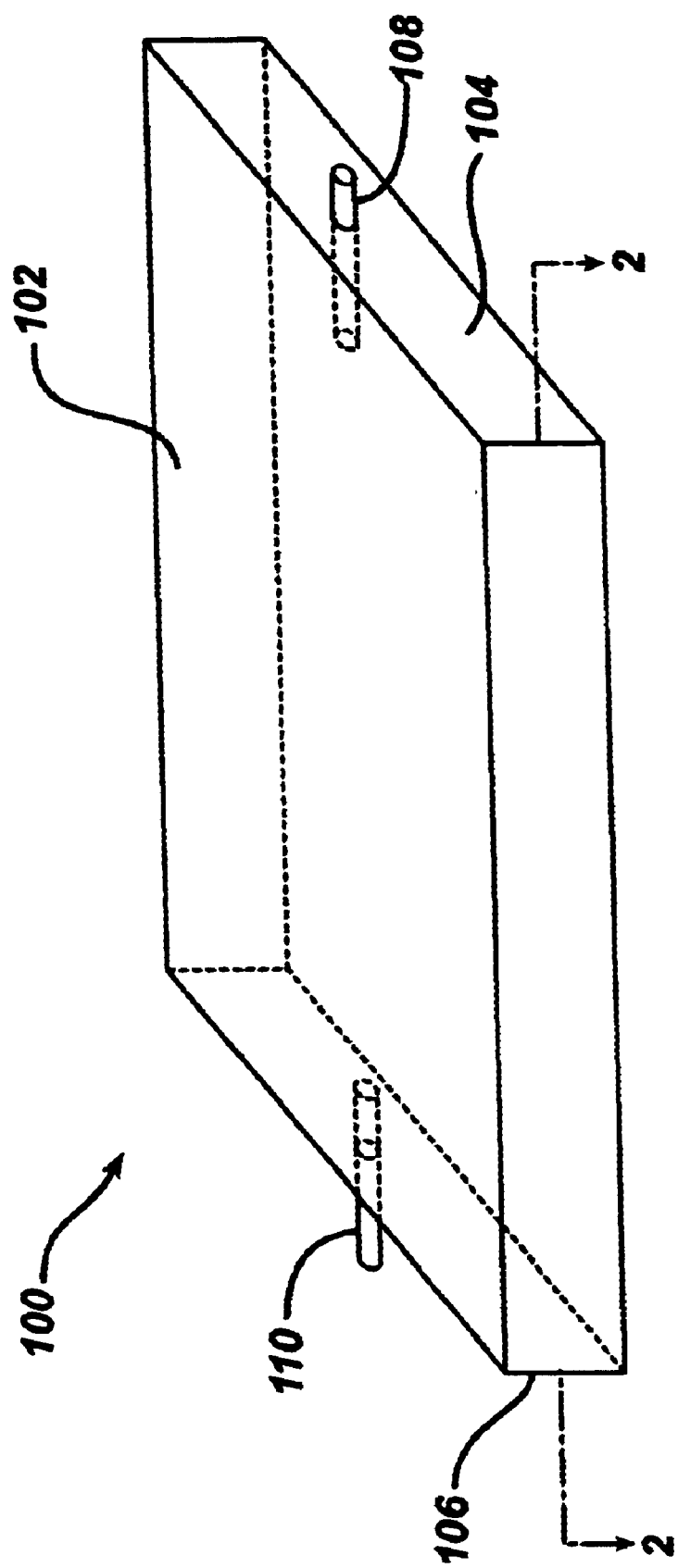
FIG. 1 is a pictorial view of a prismatic metal-air battery embodying the present invention.

Referring now in more detail to the drawings, in which like numerals refer to like parts throughout the several views, FIG. 1 is a pictorial view of a prismatic metal-air battery 100 embodying the present invention. A group of metal-air cells 200 (shown in FIG. 2) can be enclosed within a casing 102, which could alternatively be cylindrical or any other shape or size casing. The casing 102 may be any type of conventional, substantially air-tight structure, but preferably is constructed of a relatively non-porous plastic. The casing 102 defines a first end 104 and a second end 106. The casing 102 isolates the metal-air cell 200 from the air outside the casing with the exception of a plurality of ventilation openings 108, 110.

In this embodiment, a single air inlet opening 108 and a single air outlet opening 110 are utilized. The inlet air opening 108 into the casing 102 is located in the first end 104 of the metal-air battery 100. The outlet air opening 110 into the casing 102 is located in the second end 106 of the metal-air battery 100.

The inlet air opening 108 and the air outlet opening 110 are tubular in shape and are sized to regulate the quantity of air into and leaving the casing 102 dependent upon the metal-air cell 200 power requirements. Those skilled in the art will recognize that the number of ventilation openings 108, 110 is not as important as the aggregate size of the ventilation openings 108, 110 in connection with the shape of the ventilation openings 108, 110. An example of ventilation opening sizing and design is shown and described in FIG. 3.

By using a large enough ratio between the length and width for the ventilation openings 108, 110, it has been found that diffusion of air through the ventilation openings 108, 110, without the assistance of an air mover, is substantially eliminated. By substantially eliminated, it is meant that the rate of diffusion of oxygen and contaminates through the ventilation openings 108, 110 is so slow that humidity transfer or drain current is sufficiently small and has little appreciable impact on the efficiency or lifetime of the metal-air cell 200. The ventilation openings 108, 110 should be sufficiently long and narrow to provide a barrier to diffusion of gases therethrough when the air mover is turned off. Those skilled in the art will appreciate how to determine the calculations for ventilation opening 108, 110 ratios required to optimize the efficiency and lifetime of the metal-air cell 200. Furthermore, those skilled in the art will recognize that any conventional shape of ventilation opening 108, 110 will have equivalent ratios to those ventilation openings 108, 110 having a defined length and width.

Preferably, ventilation openings 108, 110 are constructed and arranged to allow a sufficient amount of airflow therethrough while an air mover is operating so that a sufficient output current, typically at least 50 ma, and preferably at least 130 ma can be obtained from the metal-air cell. In addition, the ventilation openings 108, 110 are preferably constructed to limit the airflow and diffusion therethrough such that the drain current that the metal-air cells are capable of providing to a load while an air mover is not forcing airflow through the ventilation openings 108, 110 is smaller than the output current by a factor of about 50 or greater. In addition, the ventilation openings 108, 110 are preferably constructed to provide an "isolation ratio" of more than 50 to 1.

The "isolation ratio" is the ratio of the rate of water loss or gain by a cell while its oxygen electrodes are fully exposed to the ambient air, as compared to the rate of water loss of gain of the cell while its oxygen electrodes are isolated from the ambient air, except through one or more limited openings. For example, give identical metal-air cells having electrolyte solutions of approximately thirty-five percent (35%) KOH is water, an internal relative humidity of approximately fifty percent (50%), the ambient air having a relative humidity of approximately ten-percent (10%), and no fan-forced circulation, the water loss from a cell having an oxygen electrode fully exposed to the ambient air should be no more than 100 times greater than the water loss from a cell having an oxygen electrode that is isolated from the ambient air, except through one or more ventilation openings 108, 110 of the type described above. In this example, an isolation ratio of more than 100 to 1 should be obtained.

More specifically, each of the ventilation openings 108, 110 preferably has a width that is generally perpendicular to the direction of flow therethrough, and a length that is generally parallel to the direction of flow therethrough. The length and width are selected to substantially eliminate airflow and diffusion through the ventilation openings 108, 110 while an air mover is not forcing airflow through the ventilation openings 108, 110. The length is greater than the width, and more preferably the length is greater than about twice the width. The use of larger ratios between length and width is preferred. Depending upon the nature of the metal-air cells, the ratio can be more than 200 to 1. However, the preferred ratio of length to width is about 10 to 1.

The ventilation openings 108, 110 could form only a portion of the path air must take between the ambient environment and the air cathodes. Each of the ventilation openings 108, 110 may be defined through the thickness of the battery casing or cell case, but preferably they are in the form of tubes as described above. In either case, the ventilation openings 108, 110 may be cylindrical, and for some applications each can have a length of about 0.3 to 2.5 inches or longer, with about 0.88 to 1.0 inches preferred, and an inside diameter of about 0.03 to 0.3 inches, with about 0.09 to 0.19 inches preferred. The total open area of each ventilation opening 108, 110 for such applications, measured perpendicular to the direction of flow therethrough, is therefore about 0.0007 to 0.5 square inches. In other applications, such as small cylindrical cells, the ventilation openings 108, 110 each can have a length of about 0.1 to 0.3 inches or longer, with about 0.1 to 0.2 inches preferred, and an inside diameter of about 0.01 to 0.05 inches, with about 0.015 inches preferred. The preferred dimensions for a particular application will be related to the geometry of the ventilation openings 108, 110 and the interior air plenums, the particular air mover utilized, and the volume of air needed to operate the cells at a desired level.

The ventilation openings 108, 110 are not necessarily cylindrical, as any cross-sectional shape that provides the desired isolation is suitable. The ventilation openings 108, 110 need not be uniform along their length, so long as at least a portion of each ventilation opening 108, 110 is operative to provide the desired isolation. Further, the ventilation openings 108, 110 may be straight or curved along their length.

Other exemplary ventilation openings and systems are disclosed in U.S. Pat. No. 5,691,074 and U.S. application Ser. No. 08/556,613, and the entire disclosure of each of those documents is incorporated herein by reference.

Figure 2:
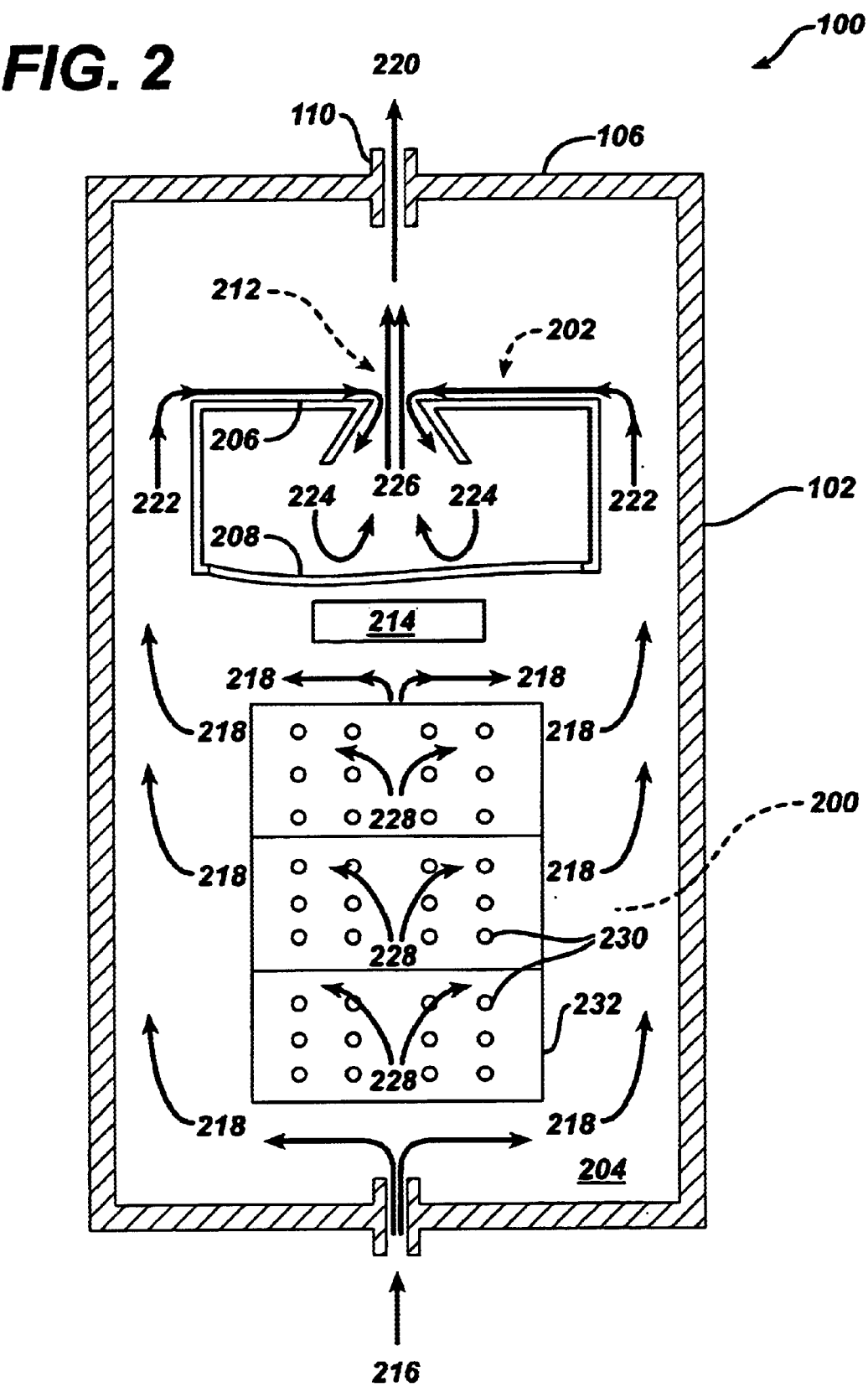
FIG. 2 is diagrammatic cross-sectional view along line 2—2 of FIG. 1.

FIG. 2 illustrates a horizontal cross-section of the metal-air battery 100 with a synthetic air jet 202 adjacent to the outlet 110, and the prismatic metal-air cells 200 adjacent to the inlet 108. The synthetic air jet 202 structure and operation are conventional, such as the structure and operation disclosed by U.S. Pat. No. 5,758,823, herein incorporated by reference. Preferably, the structure of the synthetic air jet is micromachined. The synthetic air jet 202 provides convective air flow both in and out of the casing 102, circulating and mixing the gases within the casing 102 inside an interior plenum 204. The synthetic air jet 202 comprises a housing 206 inside the interior plenum 204. The housing 206 can be configured into many different shapes or designs to generate an air flow into the casing 102, an air flow within the interior plenum 204, and an air flow out of the battery casing 102. The air flow capacity of the synthetic air jet 202 is selected depending upon the size of the casing 102 and the power requirements of the metal-air cell 200 configuration.

For example, a suitable design for a synthetic air jet 202 can be, but is not limited to, a flexible, metallized diaphragm 208 incorporated into a bottom wall 210 of the synthetic air jet housing 206, opposite an opening 212 in the synthetic air jet housing 206. When the diaphragm 208 vibrates, the internal volume of the synthetic jet housing 206 changes causing an air flow into, within, and out of the housing 206, as described in U.S. Pat. No. 5,758,823. Another suitable design for a synthetic air jet 202 (not shown) incorporates a reciprocating piston into a wall of the synthetic air jet housing 206. When the piston reciprocates, the internal volume of the synthetic air jet housing 206 changes causing an air flow into, within, and out of the housing 206. The air flow into the housing 206 and the jet of air out through the same opening 212 occurs in a well-known manner.

Changing the internal volume of the synthetic air jet housing 206, thereby activating the synthetic air jet 202, provides control over the synthetic air jet 202 to generate an air flow through the battery 100. For example, in a synthetic air jet 202 with a flexible, metallized diaphragm 208 incorporated into the bottom wall 210 of a synthetic air jet housing 206, a suitable means for changing the internal volume of the synthetic air jet housing 206 can be, but is not limited to, an electrode 214 positioned near the diaphragm 208 to apply an electrical bias to attract and/or to repel the diaphragm 208. The potential needed to drive the electrode 214 is obtained from the battery 100 itself. Wires (not shown) connect the electrode 214 to the battery terminals (not shown). The inward and outward strokes of the diaphragm 208 may both be driven by reversing the polarity of the electrode 214. Alternatively, one stroke may be driven, followed by a delay during which natural resilience of the diaphragm 208 returns it to its natural position. Another example of a suitable means for changing the internal volume of the synthetic air jet housing 206 can be a pulsing circuit operating at 10–20 Hz to apply an electrical bias to attract and/or repel the diaphragm 208. Other means for changing the internal volume of the synthetic air jet housing 206 or means for activating a synthetic air jet 202 can include, but are not limited to, a piezoelectric transducer, a waveform/sinusoidal drive transducer, a thermostatic actuator, a thermoelectrical actuator, a thermopneumatic actuator, a shape memory alloy, any magnetic method, or any other drive or actuator used in conjunction with a diaphragm, piston, or any other movable structure that can be incorporated into the synthetic air jet housing 206. Other suitable means for changing the internal volume of the synthetic air jet housing 206 or means for activating a synthetic air jet 202 can include those described in U.S. Application entitled "Air Managing Systems and Methods for Metal-Air Batteries Utilizing a Diaphragm", filed concurrently herewith, application Ser. No. 09/602,187, commonly assigned and incorporated herein by reference.

Generally, circulating gases provide reactant air to the prismatic metal-air cells 200. The arrows shown in FIG. 2 represent a typical circulation of gases or air flow into (arrows 216), within (arrows 218), and out (arrows 220) of the casing 102; and air flow into (arrows 222), within (arrows 224), and out (arrows 226) of the synthetic air jet housing 206.

The synthetic air jet 202 may be positioned within the casing 102 or adjacent to the casing 102 in communication with one of the ventilation openings 108, 110. For example, if the synthetic air jet 202 is located within the casing 102, the ventilation openings 108, 110 are positioned such that an inlet opening 108 and the outlet opening 110 are on opposite sides of the synthetic air jet 202. The only requirement for the positioning of the synthetic air jet 202 and the ventilation openings 108, 110 is that they are capable of creating a convective air flow along the path 216–220 with respect to the casing 102. The synthetic air jet 202 may be mounted within or adjacent to the casing 102 in any convenient manner.

When the synthetic air jet 202 is activated, ambient air is drawn into the air inlet opening 108. As shown by the arrows in FIG. 2, the inlet air 216 is drawn through the air inlet opening 108 and into the interior plenum 204 of the casing 102. The air flow 218 travels through the interior plenum 204 to provide a reactant air flow 228 over the air cathodes (not shown) of the prismatic metal-air cells 200, and at least part of the air flow 222 is drawn into the opening 212 of the synthetic air jet 202. The air flow 224 circulates within the synthetic jet housing 206 until the synthetic air jet 202 expels the air jet 226 out through the opening 208 and into the interior plenum 206 of the casing 102. This increases the pressure near the air outlet opening 110, so that some air flow 220 is further expelled through the air outlet opening 110 through the casing 102 and into the ambient air outside of the casing 102. The same pressure differential causes make up air to be drawn in through the inlet 108. When the means to activate the synthetic air jet 202 is inoperative, the rate of diffusion of air through the ventilation openings 108, 110 is reduced to optimum low levels described previously.

It is well understood in the art that the reactant air flow 228 reacts at the cathode of the metal-air cell 200. Further, it is well understood in the art that reactant air flow 228 enters openings 230 in a mask of the cell casing 232 surrounding the metal-air cell 200, and provides air to the air cathode dependent upon the size of the openings 230 in the cell casing 232. Furthermore, the size of the casing openings 230, the ventilation openings 108, 110, the capacity of the synthetic air jet 202, and the total exposed area of the cathode are selected dependent upon the overall size and power requirements of the battery 100.

Second Embodiment of the Present Invention

Figure 3:
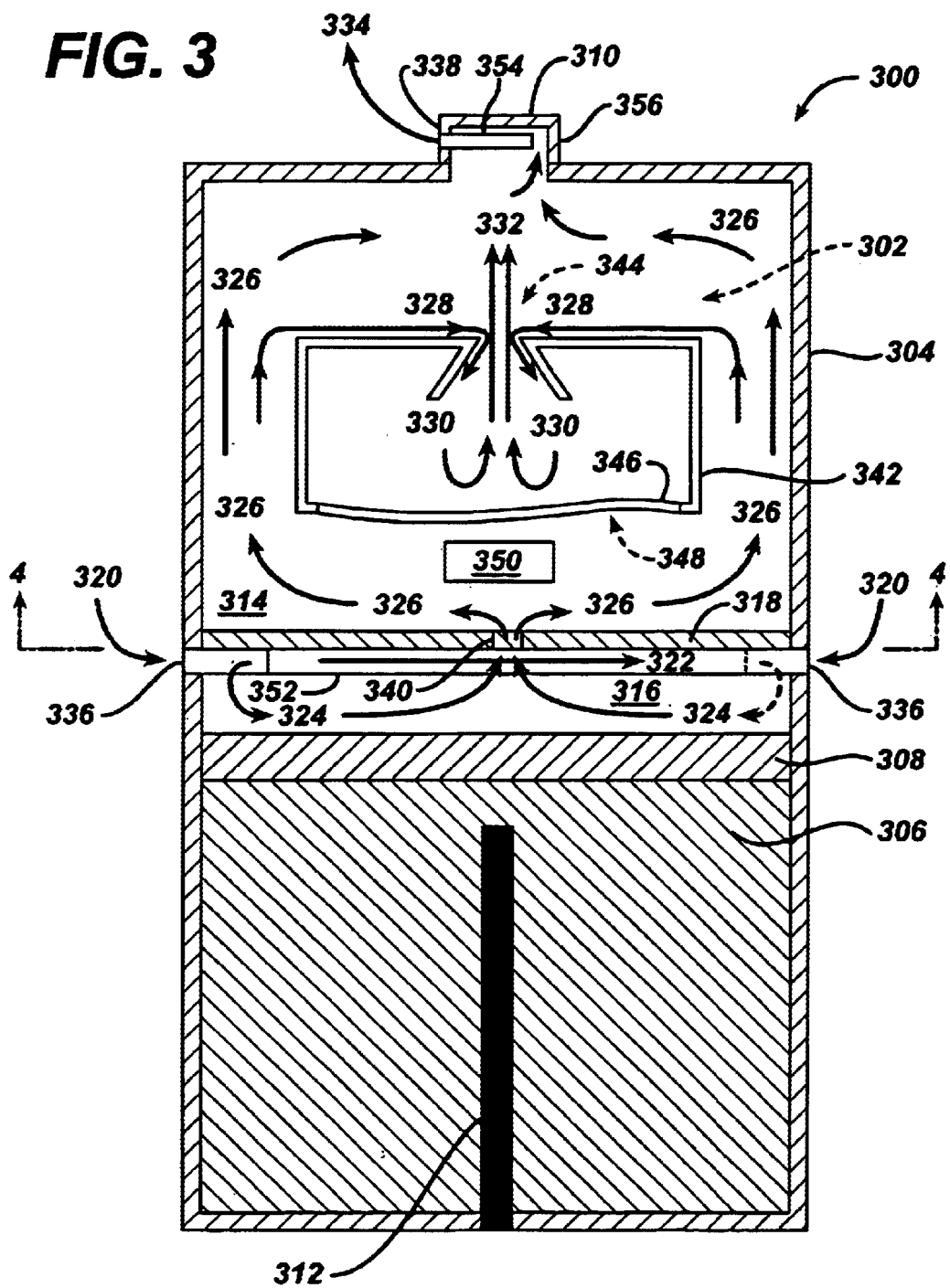
FIG. 3 is a diagrammatic axial cross-sectional view of a cylindrical cell according to a second embodiment of the present invention.
Figure 4:
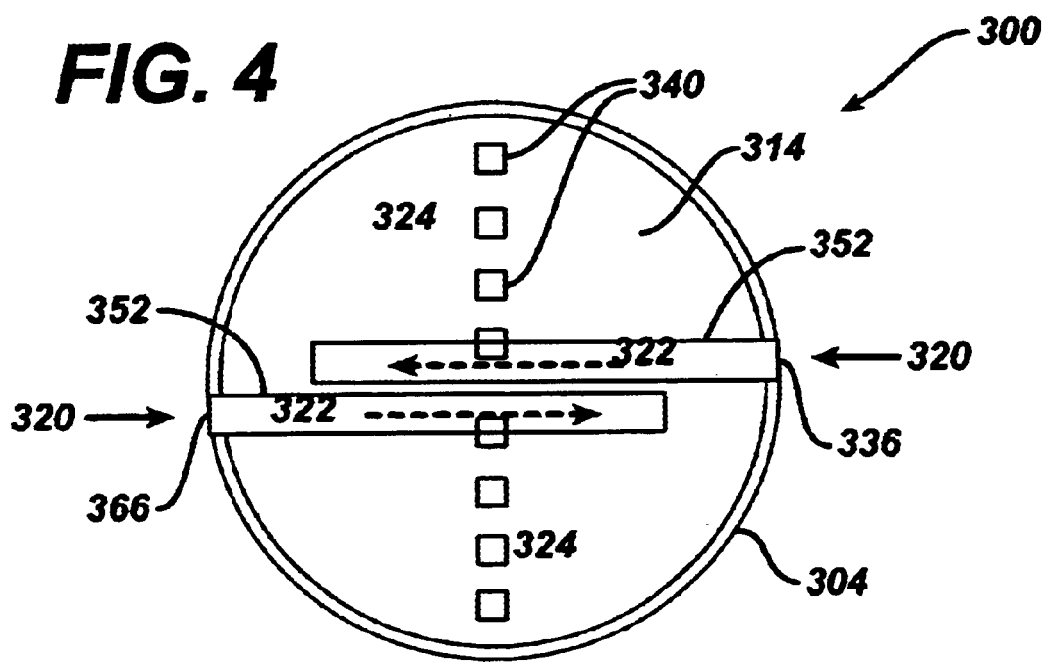
FIG. 4 is a radial cross-sectional view along line 4—4 of FIG. 3, showing the interior of the cell.
Figure 5:
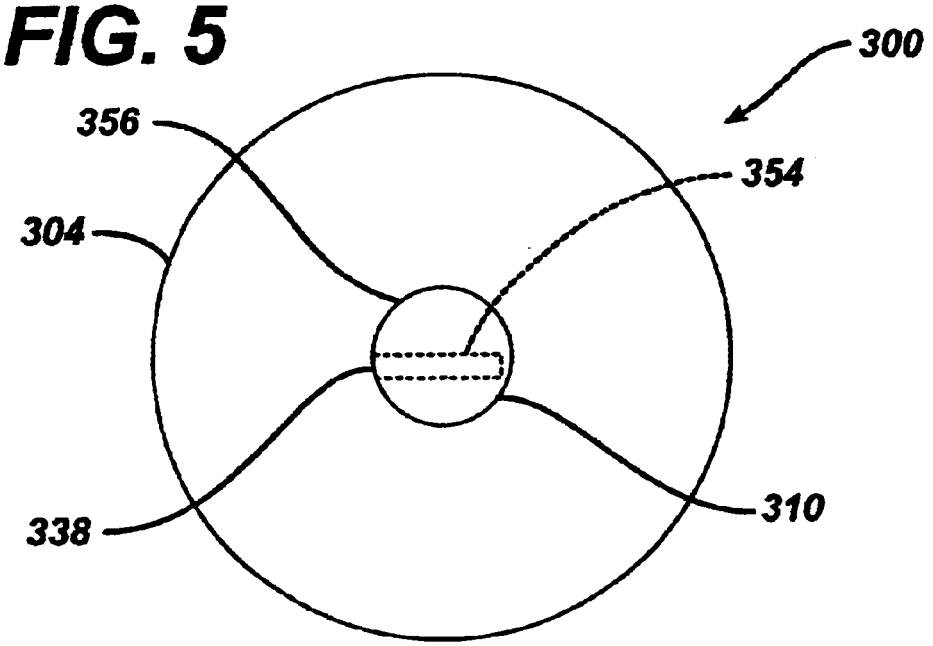
FIG. 5 is a top view of the exterior of the cell shown in FIGS. 3 and 4.

A second embodiment of a power supply embodying the present invention is shown in FIGS. 3–5. FIG. 3 illustrates a cylindrical metal-air cell 300 with a synthetic air jet 302. FIG. 4 illustrates a cross-section of the power supply in FIG. 3, and FIG. 5 shows a top view of the power supply in FIG. 3.

The metal-air cell 300 is composed of a casing 304 surrounding anode material 306 in the bottom of the casing 304, and an air cathode 308 above an anode 306 (with separators (not shown) between the anode and the cathode.) The air cathode 308 is connected by a conductor (not shown) to a terminal 310 positioned at the top of the casing 304, and insulated from the bottom of the casing 304. An anode current collector spike 312 extends along the axis of the cell 300 through the anode material 306 and contacts the conductive casing 304 at the bottom of the cell 300. A synthetic air jet 302 is positioned in the upper part of the casing 304.

In the embodiment of FIG. 3, the interior of a cell 300 is divided into an upper plenum 314 and a lower plenum 316 by a baffle plate 318. Typically, the interior plenum 314, 316 is arranged inside the metal-air cell 300 to direct the air flow 320–334 from air inlet openings 336 below the baffle plate 318, across the air cathode 308 of the metal-air cell 300, and out through an air outlet opening 338 in the following manner.

Air flow 320 enters the cell 300 through the air inlet openings 336. After the air flow 324 circulates across the face of the air cathode 308 in the lower plenum 316, the air is directed to the upper plenum 314 through openings 340 in the baffle plate 318. Part of the air flow 320–334 is then expelled from the metal-air cell 300 through the air outlet opening 338 in the top of the casing 304. Any desired size, number, or arrangement of openings 340 in the baffle plate 318 may be provided to optimize the quantity, distribution, and direction of the air flow through the metal-air cell 300.

The arrows 320–334 shown in FIG. 3 represent a typical circulation of gases through the casing 304 and through the synthetic air jet 302 to provide reactant air flow 324 to the air cathode 308 of the cylindrical metal-air cell 300. Repeatedly changing the internal volume of the synthetic air jet 302 creates a pumping action within the casing 304 providing convective air flow through the casing 304. The pumping action of the synthetic air jet 302 circulates and mixes the gases or air within the casing 304, and provides reactant air flow 324 to the air cathode 308 of the metal-air cell 300.

The air flow 320–334 through the synthetic air jet 302 begins when the internal volume of the synthetic air jet 302 expands, drawing air flow 328 into a synthetic air jet housing 342 through a jet opening 344 in the housing 342. The air flow 330 within the housing 342 of the synthetic air jet 302 circulates until the internal volume of the synthetic air jet 302 decreases, expelling the air flow 332 outward through the jet opening 344 to the ambient air outside of the casing 304.

The air flow 320–334 through the synthetic air jet 302 causes reactant air flow 324 to be forced into the casing 304 through the air inlet openings 336 in the casing 304 when the internal volume of the synthetic air jet 302 expands. The air flow 324 through the lower plenum 316 above the air cathode 308 provides reactant air 324 for the air cathode 308. After the air flow 326 circulates to the upper plenum 314, at least part of the air in the casing 304 is expelled through the air outlet opening 338 in the casing 304 when the internal volume of the synthetic air jet 302 decreases. Thus, both the air flow 320–326, 334 through the casing 304 and the air flow 328–332 through the synthetic air jet 302 are created by the activation of the synthetic air jet 302.

A means for changing the internal volume of the synthetic air jet housing 342 to activate the synthetic air jet 302 creates the change of the internal volume of the synthetic air jet housing 342. As previously described in FIG. 2, a means for changing the internal volume of the synthetic air jet housing 342 to activate a synthetic air jet 302 provides control over the synthetic air jet 302 to generate an air flow through a metal-air cell 300. For example, in a synthetic air jet 302 with the flexible, metallized diaphragm 346 incorporated into the bottom wall 348 of the synthetic air jet housing 342, a suitable means for changing the internal volume of the synthetic air jet housing 342 to activate the synthetic air jet 302 can be, but is not limited to, an electrode 350 positioned near the diaphragm 346 to attract and/or to repel the diaphragm 346 in the manner described above. Other suitable means for changing the internal volume of the synthetic air jet housing 342 to activate the synthetic air jet 302 have been previously disclosed.

To provide a reactant air flow 324 to the air cathode 308 of the metal-air cell 300, the synthetic air jet 302 may be positioned within the casing 304 or adjacent to the casing 304 in communication with the ventilation openings 336, 338 through the casing 304. For example, as previously shown in FIG. 2, the synthetic air jet 302 flow could be directed where the jet opening 344 in the housing 342 communicates with an upper interior plenum 314 of the battery 300. The casing 304 air flow 320–334 would directly mix with the air flow in and out of the synthetic air jet 302. Other locations may be selected for the synthetic air jet 302 depending upon the synthetic air jet 302 capacity and air flow requirements of the metal-air cell 300. One or more air inlet openings 336 and air outlet openings 338 may be provided.

The metal-air cell 300 preferably incorporates diffusion isolation tubes 352, 354 into the air inlet openings 336 and the air outlet opening 338, where the air flow 320–334 passes through the casing 304. Inlet diffusion isolation tubes 352 are located at the air inlet openings 336, connected to each air inlet opening 336 and extending from a point on the casing 304 towards the opposite wall. The inlet diffusion isolation tubes 352 allow air to diffuse through the casing 304 wall and the air then empties into the lower plenum 316.

The outlet diffusion isolation tubes 354 are located in the top of the casing 304 within a projection 356 of the casing supporting the battery terminal 310. Each outlet diffusion isolation tube 354 connects to an air outlet opening 338 and extends from a point on a side wall of the projection 356 of the casing 304 towards the opposite wall. Air is forced out of the casing 304 through the outlet diffusion isolation tube 354.

As shown in FIGS. 3 and 4, the synthetic air jet 302 draws inlet air 320 from the ambient air outside the casing 304 into the two opposing air inlet openings 336 located in the casing 304. The inlet air 320 passes into a corresponding inlet diffusion isolation tube 352 connected to each air inlet opening 336. The air flow 322 from each inlet diffusion isolation tube 352 then passes into the lower plenum 316. The inlet diffusion isolation tubes 352 are arranged horizontally from the casing 304 and extend across the interior of the metal-air cell 300. One skilled in the art will appreciate that any size, number, or arrangement of inlet air openings 336 and corresponding inlet diffusion isolation tubes 352 may be provided to optimize the reactant air flow 324 to the air cathode 308 to maximize the power capacity of the metal-air cell 300. The air inlet openings 336 and their corresponding inlet diffusion tubes 352 have cross-sectional areas and lengths selected to substantially eliminate air flow into the casing 304 when the synthetic air jet 302 is turned off, similar to the ventilation openings 108, 110 described in FIG. 2.

After the air flow 322 passes through the inlet diffusion tubes 352 and into the lower plenum 316, the air flow 324 passes across the metal-air cell 300. The lower plenum 316 allows the air cathode 308 of the metal-air cell 300 to be exposed to the inlet air 320 drawn into the inlet openings 336 and through the inlet diffusion isolation tubes 352. The air 324 in the lower interior air plenum 316 flows upward to the upper interior air plenum 314 through the openings 340 in the circular baffle plate 318 separating the lower plenum 316 from the upper plenum 314.

The circular baffle plate 318 on top of the inlet diffusion isolation tubes 352 prevents the air flow 312 from directly flowing from the inlet diffusion isolation tubes 352 to the upper plenum 314, bypassing the air cathode 308 of the metal-air cell 300. Instead, the air 320 from the inlet diffusion isolation tubes 352 is forced downward by the intersection of the baffle plate 318 and the casing 304, and the air flow 324 circulates back around towards the center of the metal-air cell 300. As the air flow 324 circulates around in the lower plenum 316, the air cathode 308 is exposed to the air flow 324 necessary for the metal-air cell 300 to generate power. As shown in FIG. 4, openings 340 in the center of the baffle plate 318 permit the air flow 324 in the lower plenum 316 to pass through the baffle plate 318 and into the upper plenum 314.

As the air flows into the upper plenum 314 as shown in FIG. 3, the air flow 326 circulates in the upper plenum 314 around the exterior housing 342 of the synthetic air jet 302 and towards the outlet diffusion isolation tube 354 in the terminal 310 (also shown in FIG. 5). When the air flow 326 reaches the top of the upper plenum 314, part of the air flow 326 is drawn into an opening 344 in the housing 342 of the synthetic air jet 302. When the synthetic air jet 302 expels an air flow 332 back through the opening 344 and into the upper air plenum 314, a portion of the air flow 332 then enters the outlet diffusion isolation tube 354. The air flow 334 leaves the outlet diffusion isolation tube 354 and passes through the casing 304 through the air outlet opening 338. The expelled air flow 334 then enters the ambient air outside of the casing 304. When the synthetic air jet 302 is deactivated, the rate of diffusion of air through the ventilation openings 336, 338 is reduced to optimum low levels. One skilled in the art will appreciate that any size, number, or arrangement of air outlet openings 338 and corresponding outlet diffusion isolation tubes 354 may be provided to optimize the air flow 320–334 to the air cathode 308 to maximize the power capacity of the metal-air cell 300.

Third Embodiment of the Present Invention

Figure 6:
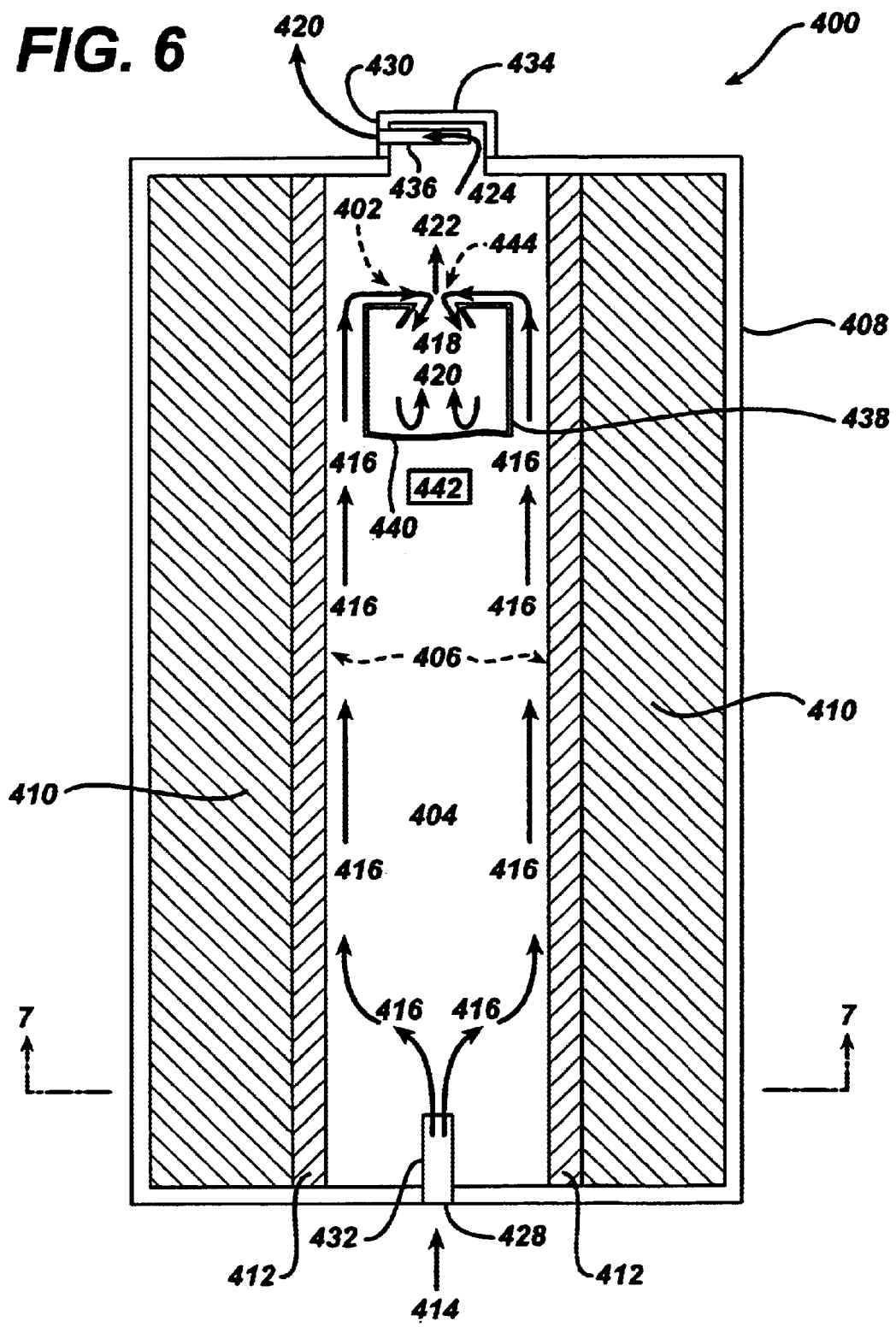
FIG. 6 is a diagrammatic axial cross-sectional view of a third embodiment of a cell according to the present invention.
Figure 7:
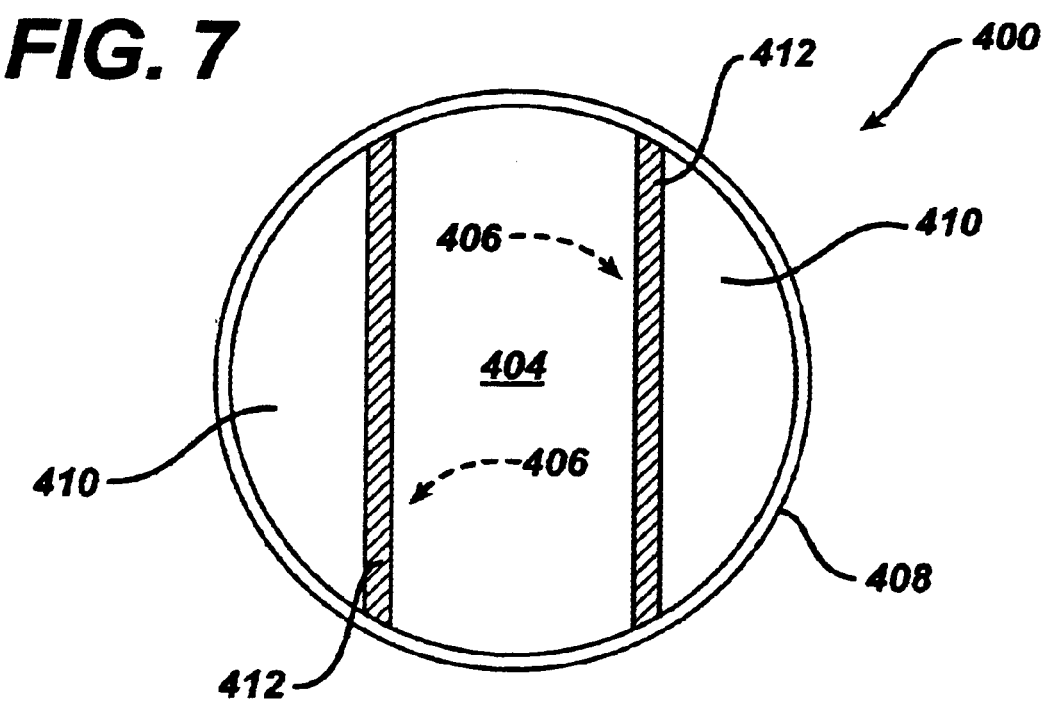
FIG. 7 is a radial cross-sectional view of the cell shown in FIG. 6 taken along line 7—7.

A third embodiment of a battery embodying the present invention is shown in FIGS. 6–7. FIG. 6 illustrates a cylindrical battery 400 with a synthetic air jet 402 in an axial air passageway 404. FIG. 7 illustrates a radial cross-section of the battery 400 shown in FIG. 6. A synthetic air jet 402 and two metal-air cells 406 are enclosed within a conductive cylindrical casing 408. The metal-air cells 406 are composed of an anode material 410 in contact with the casing 408, and an air cathode 412 (with separators (not shown) between the anode and the cathode). One side of the air cathodes 412 faces the axial air passageway 404 and the opposing side of the air cathodes 412 faces the anode 410 material. A synthetic air jet 402 is positioned in the upper part of the casing 408 in the axial air passageway 404, which provides an interior air plenum. The arrows 414–426 represent a typical circulation of air flow or gases into, within, and out of the casing 408 to provide reactant air flow 416 to the air cathodes 412.

The casing 408 isolates the metal-air cells 406 from the ambient air with the exception of a plurality of ventilation openings 428, 430. Preferably, a single air inlet opening 428 and a single air outlet opening 430 permit the ambient air to communicate with the axial air passageway 404 of the battery 400. As described previously, the number of ventilation openings 428, 430 is not as important as the aggregate size of the ventilation openings 428, 430 in connection with the shape of the ventilation openings 428,430.

The inlet air opening 428 through the casing 408 is located on bottom of the casing 408. The inlet air opening 428 is of sufficient size to admit a quantity of air into the casing 408 dependent upon the metal-air cells' 406 power requirements. An inlet diffusion isolation tube 432 connects to the inlet opening 428 and extends from the inlet opening 428 towards the axial air passageway 404 of the battery 400. As described previously, the size, number, shape, or arrangement of inlet diffusion isolation tubes 432 corresponding to the inlet openings 428 may be selected to further optimize the air flow to the metal-air cells 406.

The outlet air opening 430 through the casing 408 is located in a terminal projection 434 at the top of the battery 400. The outlet air opening 430 is of sufficient size to permit a quantity of air to be expelled from the casing 408 dependent upon the metal-air cells' 406 power requirements. An outlet diffusion isolation tube 436 connects to the outlet air opening 430, and extends from the casing 408 in the terminal projection 434 towards the axial air passageway 404 of the battery 400. Parameters for determining the size, number, shape, and configuration of outlet opening 430 sizes and their corresponding outlet diffusion isolation tubes 436 have been previously discussed.

The synthetic air jet 402 provides convective air flow through the axial air passageway 404 adjacent to the air cathodes 412. Similar to the units previously described in FIGS. 2–5, the synthetic air jet 402 can comprise a housing 438 with a flexible, metallized diaphragm 440 incorporated into the housing 438. The diaphragm 440 operates to change the internal volume of the synthetic air jet housing 438. The synthetic air jet 402 can be configured into many different shapes and designs to generate an air flow through the battery 400.

A means for changing the internal volume of the synthetic air jet housing 438 to activate a synthetic air jet 402 provides control over the air flow through the battery 400 generated by the synthetic air jet 402. For example, as previously described in FIGS. 2–5, a means for changing the internal volume of the synthetic air jet housing 438 to activate a synthetic air jet 402 can be an electrode 442 configured to attract and/or repel the flexible, metallized diaphragm 440 incorporated into the synthetic air jet housing 438. A means for changing the internal volume of the synthetic air jet housing 438 to activate a synthetic air jet 402 can be configured into many different shapes and designs depending upon the configuration of the synthetic air jet 402.

When the synthetic air jet 402 is activated by the electrode 442, ambient air is drawn into the air inlet opening 428. The inlet air flow 414 drawn through the air inlet opening 428 enters the inlet diffusion tube 432, and passes into the axial air passageway 404. The air flow 416 travels through the axial air passageway 404 to provide reactant air for the air cathodes 412, and at least part of the air flow 416 is drawn into an opening 444 in the housing 438 of the synthetic air jet 402. When the synthetic air jet 402 expels an air flow 422 back through the opening 444 and into the axial air passageway 404, a portion 424 of the air flow 422 then enters the outlet diffusion isolation tube 436. The air flow 424 leaves the outlet diffusion isolation tube 436 and passes through the casing 408 through the air outlet opening 430. The expelled air flow 426 then enters the ambient air outside of the casing 408. When the synthetic air jet 402 is deactivated, the rate of diffusion of air through the ventilation openings 428, 430 is reduced to optimum low levels.

Fourth Embodiment of the Present Invention

Figure 8:
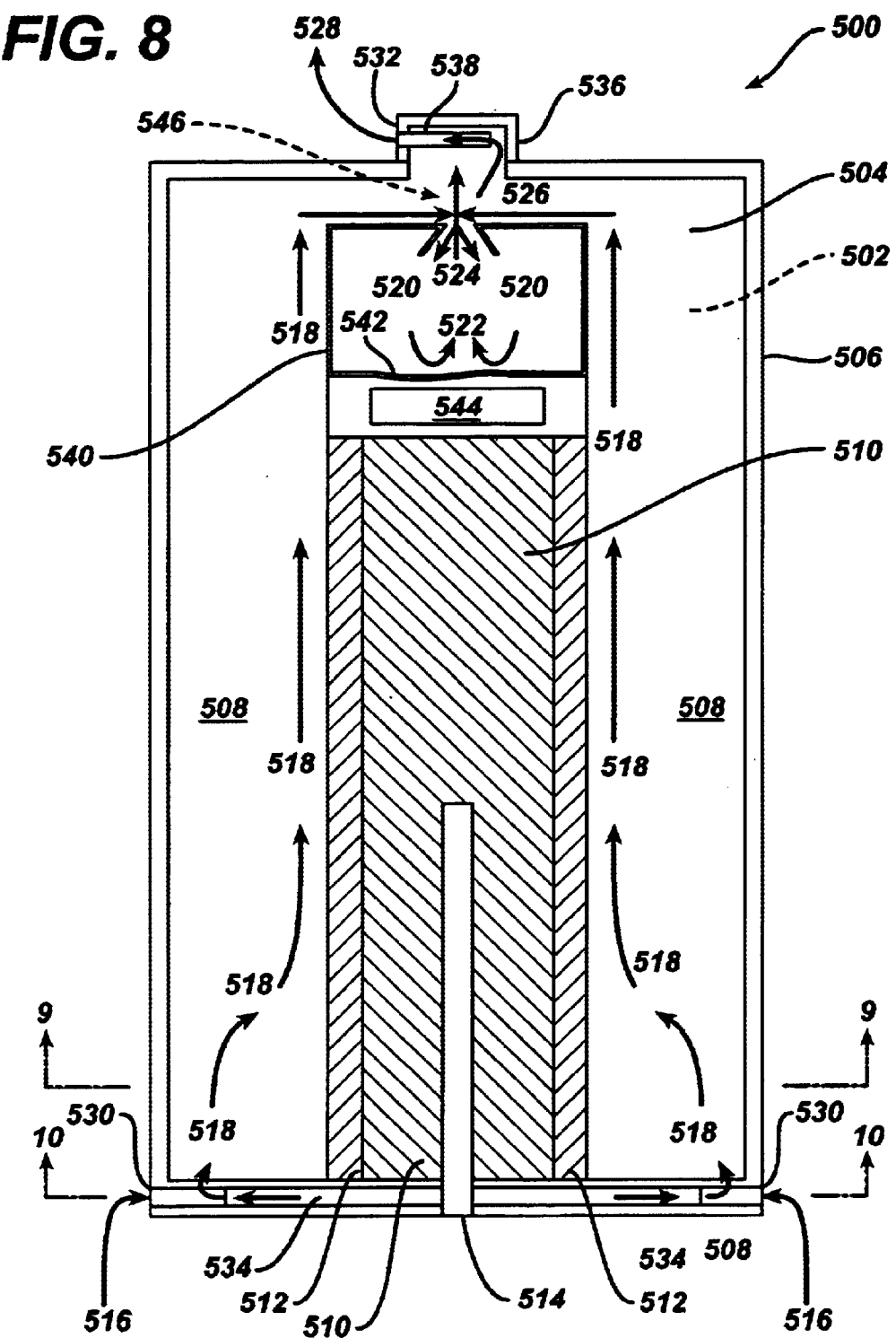
FIG. 8 a diagrammatic axial cross-sectional view of a fourth embodiment of a cell according to the present invention.
Figure 9:
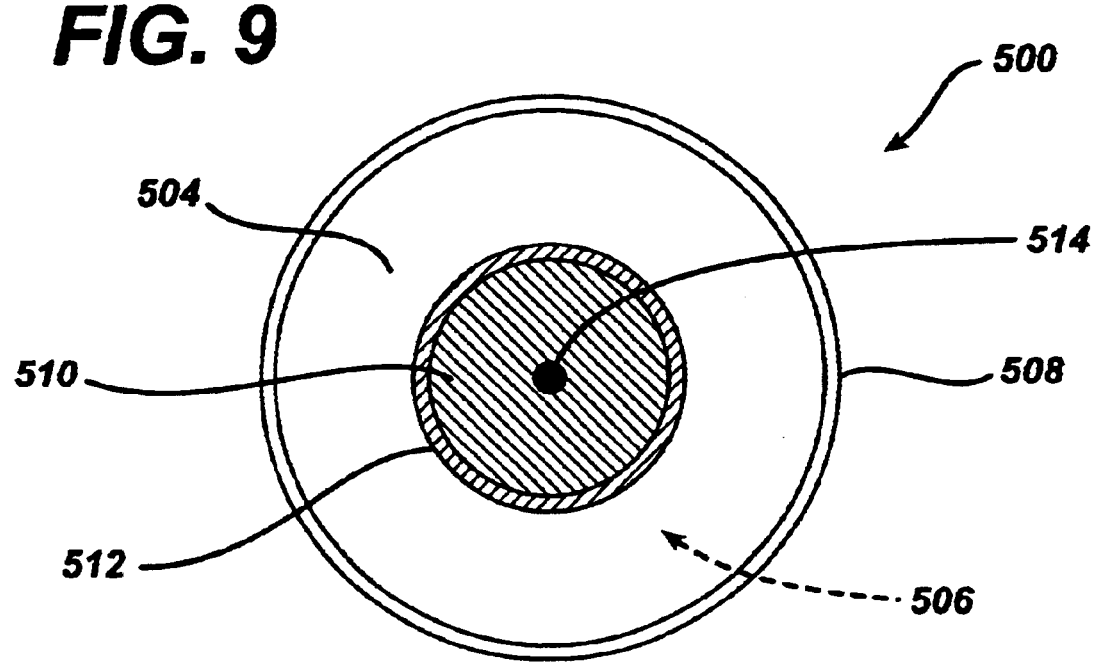
FIG. 9 is a radial cross-sectional view of the cell shown in FIG. 8 intermediate to its ends taken along line 9—9.
Figure 10:
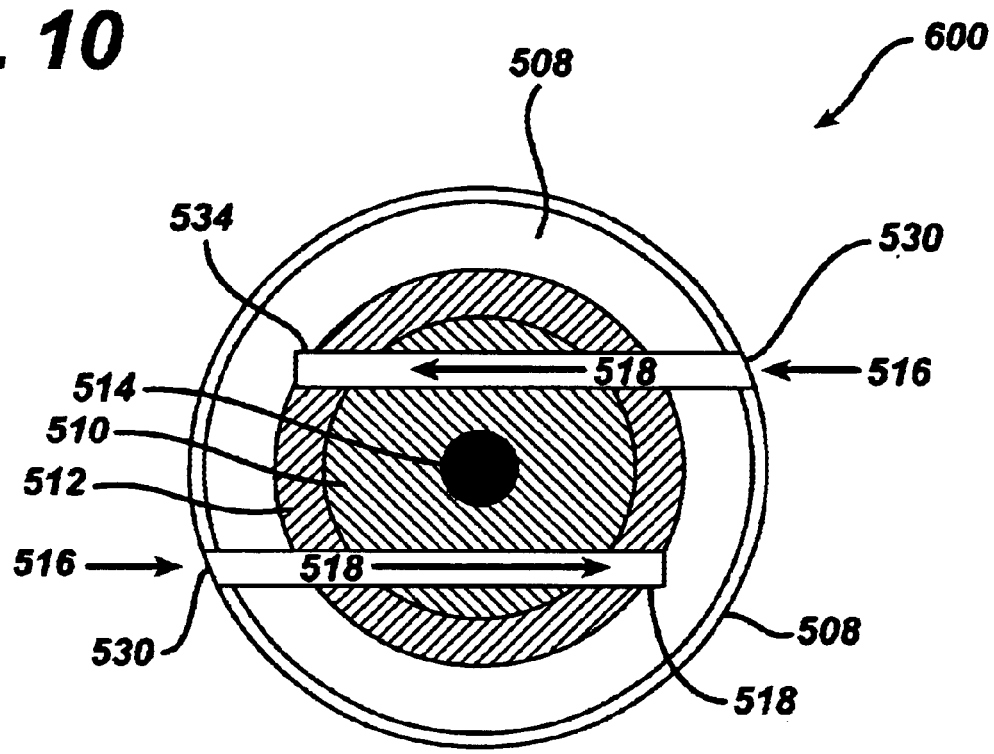
FIG. 10 is a radial cross-sectional view of the cell shown in FIG. 8, taken along line 10—10.

FIGS. 8–10 illustrate a fourth embodiment of a cylindrical cell 500 with a synthetic air jet 502 in an upper air plenum 504. FIG. 8 illustrates the cylindrical metal-air cell 500 enclosed within a conductive cylindrical casing 506. FIGS. 9 and 10 illustrate radial cross-sections of the cylindrical metal-air cell 500 shown in FIG. 8.

The cylindrical metal-air cell 500 is enclosed within a conductive cylindrical casing 506 with an upper air plenum 504 and an annular air passageway 508. The metal-air cell 500 is composed of a cylindrical anode 510 and an annular air cathode 512 (with separators (not shown) between the anode and the cathode). The anode 510 and the cathode 512 extend from near the bottom of the casing 506 in the annular air passageway 508 to the upper air plenum 504. An anode current collector spike 514 extends along the axis of the cell 500 through the anode 510 material and contacts the conductive casing 506 at the bottom of the cell 500. An outer side of the air cathode 512 faces the annular air passageway 508 formed between the cathode 512 and the cylindrical wall of the casing 506. The size of the annular passageway 508 is exaggerated in the drawing. In practice, the passageway 508 is made as narrow as possible to maximize the volume of battery chemistry within the cell 500. The opposing side of the air cathode 512 wraps around the anode 510 material, together forming a cylindrical metal-air cell 500. The synthetic air jet 502 is positioned in the upper part of the casing 506 in the upper air plenum 504. The arrows 516–528 represent a typical circulation of air flow or gases into, within, and out of a casing 506

The casing 506 isolates the metal-air cell 500 from the ambient air with the exception of a plurality of ventilation openings 530, 532. Preferably, two air inlet openings 530 and a single air outlet opening 532 permit the ambient air to communicate with the upper air plenum 504 of the cell 500. As described previously, the number of ventilation openings 530, 532 is not as important as the aggregate size of the ventilation openings 530, 532 in connection with the shape of the ventilation openings 530, 532.

The inlet air openings 530 through the casing 506 are located on opposing side walls of the casing 506 towards the bottom portion of the casing 506. An inlet diffusion isolation tube 534 connects each inlet opening 530 and extends from each inlet opening 530 towards the annular air passageway 508 of the cell 500 on the opposite side of the cathode/anode assembly. The inlet air openings 530 and the inlet diffusion isolation tubes 534 are of sufficient size to admit a quantity of air into the casing 506 dependent upon the metal-air cell's power requirements. As described previously, any size, number, shape, or arrangement of inlet diffusion isolation tubes 534 corresponding to the inlet openings 530 may be provided to further optimize the air flow to the metal-air cell 500.

An air outlet opening 532 through the casing 506 is located in a terminal projection 536 at the top of the cell 500. An outlet diffusion isolation tube 538 connects to the air outlet opening 532, and extends from the casing 506 in the terminal projection 536 towards the upper air plenum 504 of the cell 500. The air outlet opening 532 and outlet diffusion isolation tube 538 are of sufficient size to permit a quantity of air to be expelled from the casing 506 dependent upon the metal-air cell's 500 power requirements. Parameters for determining the size, number, shape, and configuration of air outlet opening 532 sizes and their corresponding outlet diffusion isolation tubes 538 have been previously discussed.

The synthetic air jet 502 provides convective air flow through the upper air plenum 504 adjacent to the air cathode 512. Similar to the units previously described in FIGS. 2–7, the synthetic air jet 502 can comprise a housing 540 with a flexible, metallized diaphragm 542 incorporated into the housing 540. The diaphragm 542 operates to change the internal volume of the synthetic air jet housing 540. The synthetic air jet 502 can be configured into many different shapes and designs to generate an air flow through the cell 500.

A means for changing the internal volume of the synthetic air jet housing to activate a synthetic air jet 502 provides control over the air flow through the cell 500 generated by the synthetic air jet 502. For example, as previously described in connection with FIGS. 2–7, a means for changing the internal volume of the synthetic air jet housing 540 to activate a synthetic air jet 502 can be an electrode 544 configured to attract and/or repel the flexible, metallized diaphragm 542 incorporated into the synthetic air jet housing 540. A means for changing the internal volume of the synthetic air jet housing 540 to activate a synthetic air jet 502 can be configured into many different shapes and designs depending upon the configuration of the synthetic air jet 502.

When the synthetic air jet 502 is activated by the electrode 544, ambient air is drawn into the air inlet opening 530. The inlet air flow 516 drawn through the air inlet opening 530 enters the inlet diffusion isolation tube 534, and then the air flow 516 passes into the annular air passageway 508. The air flow 518 provides reactant air for the air cathode 512 as the air flow 518 travels axially through the annular air passageway 508 and into the upper air plenum 504. At least part of the air flow 520 is drawn into an opening 546 in the housing 540 of the synthetic air jet 502. The air flow 522 circulates within the synthetic air jet 502 until the synthetic air jet 502 expels an air jet flow 524 through the opening 546. When the synthetic air jet 502 expels an air flow 524 through the opening 546 and into the upper air plenum 504, the air flow 526 then enters the outlet diffusion isolation tube 538. The air flow 526 leaves the outlet diffusion isolation tube 538 and passes through the casing 506 through the air outlet opening 532. The expelled air flow 528 then enters the ambient air outside of the casing 506. When the synthetic air jet 502 is deactivated, the rate of diffusion of air through the ventilation openings 530, 532 is reduced to optimum low levels.

Fifth Embodiment of the Present Invention

Figure 11:
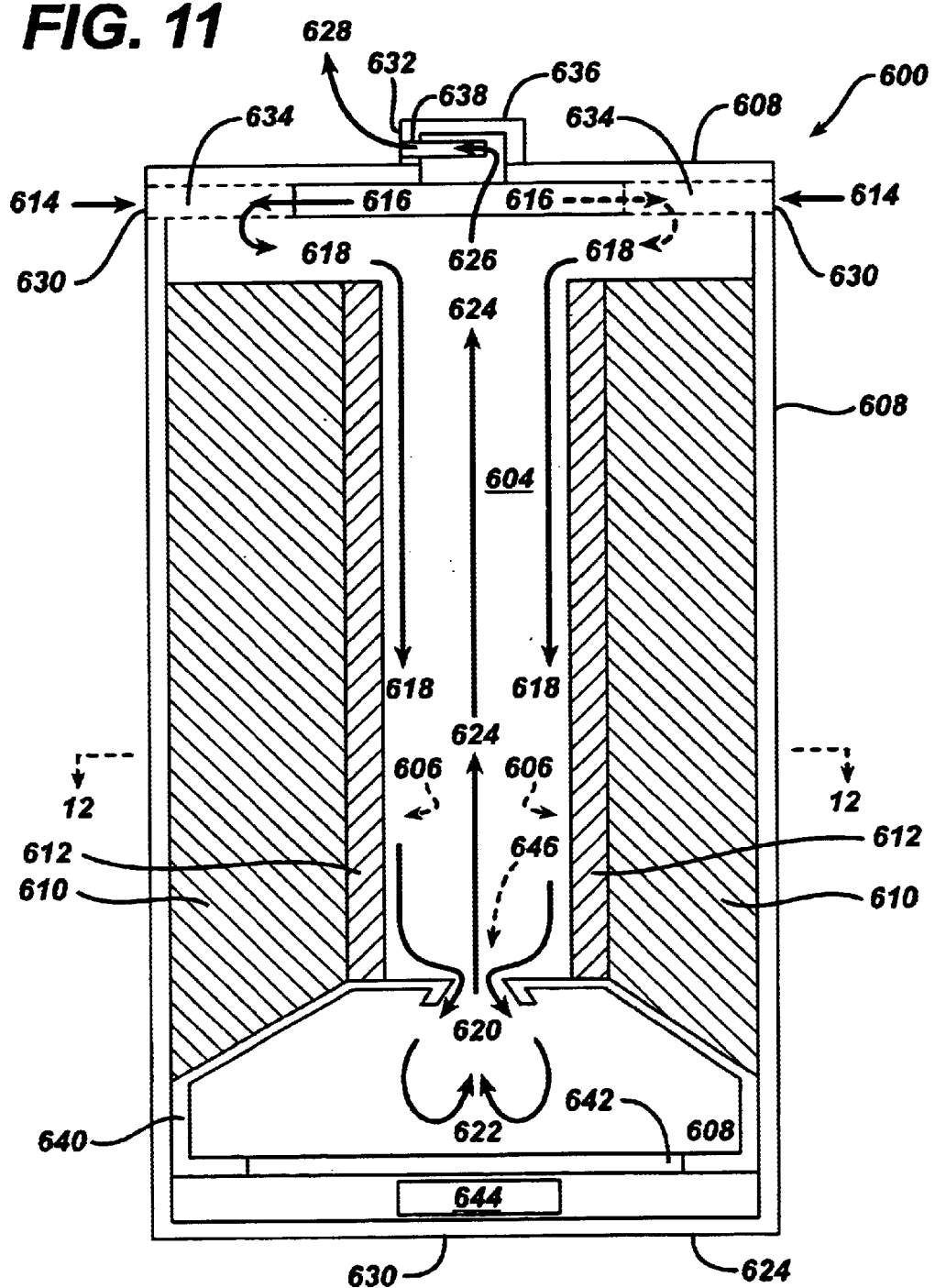
FIG. 11 is a diagrammatic axial cross-sectional view of a fifth embodiment according to the present invention.
Figure 12:
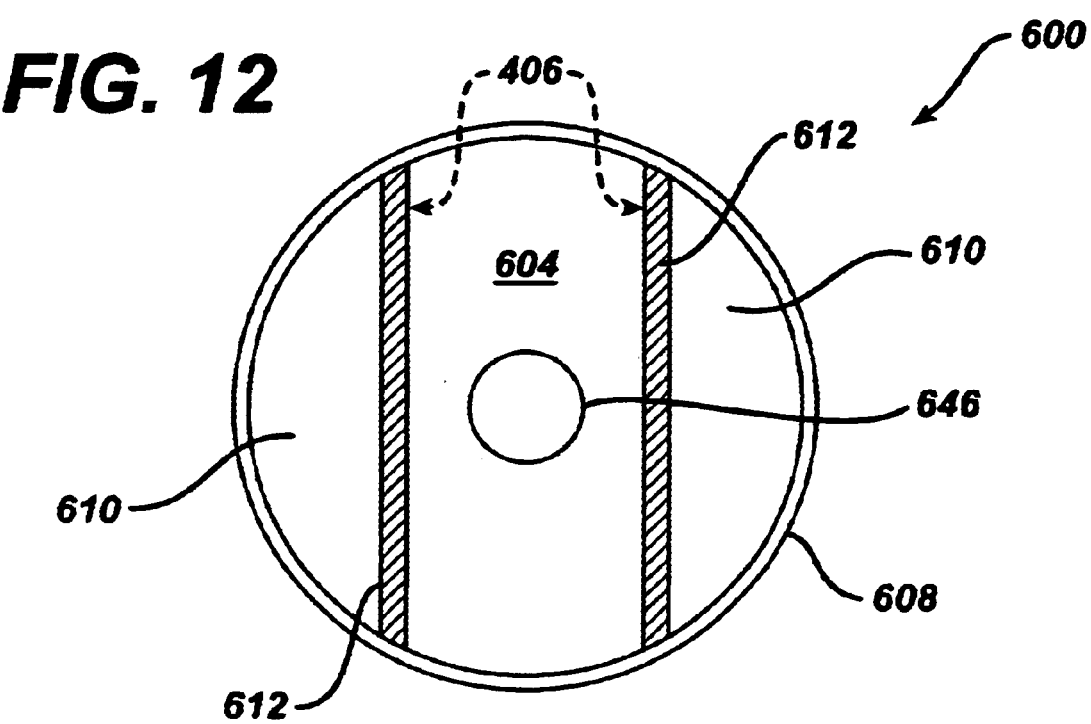
FIG. 12 is a radial cross-sectional view of the battery shown in FIG. 11 taken along line 12—12.

A fifth embodiment of a battery 600 embodying the present invention is shown in FIGS. 11–12. FIG. 11 illustrates a cylindrical battery 600 with a synthetic air jet 602 in an axial air passageway 604 or an interior air plenum. FIG. 12 illustrates a radial cross-section of the battery 600 shown in FIG. 11.

A synthetic air jet 602 and two metal-air cells 606 are enclosed within a conductive cylindrical casing 608. The metal-air cells 606 are composed of an anode material 610 in contact with the casing 608 and an air cathode 612 (with separators (not shown) between the anode and the cathode). The air cathodes 612 of each metal-air cell 606 are positioned to face the axial air passageway 604. The opposing side of each air cathode 612 faces the anode 610 material. The synthetic air jet 602 is positioned in the lower part of the casing 608 in the axial air passageway 604. The arrows 616–628 represent a typical circulation of air flow or gases into, within, and out of a casing 608 to provide reactant air flow 616 to the air cathodes 612.

The synthetic air jet 602 is located towards the bottom of the axial air passageway 604. The metal air-cells 606 are positioned within the axial air passageway 604 substantially parallel to and along the sides of the axial air passageway 604. The casing 608 isolates the metal-air cells 606 from the ambient air with the exception of a plurality of ventilation openings 630, 632. Preferably, two air inlet openings 630 and a single air outlet opening 632 permit the ambient air to communicate with the axial air passageway 604 of the battery 600. As described previously, the number of ventilation openings 630, 632 is not as important as the aggregate size of the ventilation openings 630, 632 in connection with the shape of the ventilation openings 630, 632.

The inlet air openings 630 through the casing 608 are located on the sides of the casing 608. The inlet air openings 630 are of sufficient size to admit a quantity of air into the casing 608 dependent upon the metal-air cells' 606 power requirements. An inlet diffusion isolation tube 634 connects to each inlet opening 630 and extends from the inlet opening 630 towards the axial air passageway 604 of the battery 600. As described previously, any size, number, shape, or arrangement of inlet diffusion isolation tubes 634 corresponding to the inlet openings 630 may be provided to further optimize the air flow to the metal-air cells 606.

The outlet air opening 632 through the casing 608 is located in a terminal projection 636 at the top of the battery 600. The outlet air opening 632 is of sufficient size to permit a quantity of air to be expelled from the casing 608 dependent upon the metal-air cells' 606 power requirements. An outlet diffusion isolation tube 638 connects to the outlet opening 632, and extends from the casing 608 in the terminal projection 636 towards the axial air passageway 604 of the battery 600. Parameters for determining the size, number, shape, and configuration of outlet opening 632 sizes and their corresponding outlet diffusion isolation tubes 638 have been previously discussed.

The synthetic air jet 602 provides convective air flow through the axial air passageway 604 adjacent to the air cathodes 612. Similar to the units previously described in FIGS. 2–10, the synthetic air jet 602 can comprise a housing 640 with a flexible, metallized diaphragm 642 incorporated into the housing 640. The diaphragm 642 operates to change the internal volume of the synthetic air jet housing 640. The synthetic air jet 602 can be configured into many different shapes and designs to generate an air flow through the battery 600.

A means for changing the internal volume of the synthetic air jet housing 640 to activate a synthetic air jet 602 provides control over the air flow through the battery 600 generated by the synthetic air jet 602. For example, as previously described in FIGS. 2–10, a means for changing the internal volume of the synthetic air jet housing to activate a synthetic air jet 602 can be an electrode 644 configured to attract and/or repel the flexible, metallized diaphragm 642 incorporated into the synthetic air jet housing 640. A means for changing the internal volume of the synthetic air jet housing 640 to activate a synthetic air jet 602 can be configured into many different shapes and designs depending upon the configuration of the synthetic air jet 602.

When the synthetic air jet 602 is activated by the electrode 644, ambient air is drawn into the air inlet openings 630. The inlet air flow 614 drawn through the air inlet openings 630 enters the inlet diffusion tubes 634, and passes into the axial air passageway 604. The air flow 618 travels through the axial air passageway 604 to provide reactant air for the air cathodes 612. At least part of the air flow 620 is drawn into an opening 646 in the housing 640 of the synthetic air jet 602. The air in the synthetic air jet 602 circulates inside the housing 640 until the synthetic air jet 602 expels the air out through the opening 646.

Pressure differentials between the exterior of the casing 608 and the interior of the casing 608 will cause an air flow 614–628 through the battery 600 even though the ventilation openings 630, 632 are at the same end of the battery 600. For example, when the synthetic air jet 602 is activated to create the air flow 614–628 shown by the arrows in FIG. 11, the air pressure of the interior the casing 608 near the ends of the inlet diffusion tubes 634 is generally lower than the air pressure outside the casing 608. As a result, ambient air is drawn into the battery 600 through the air inlet openings 630 and is drawn into the axial air passageway 604. The air flow 618 in the axial air passageway 604 supplies reactant air to the air cathodes 612. As the synthetic air jet 602 expels an air flow 624 through the opening 646 and into the axial air passageway 604, the air pressure within the casing 608 through the center of the axial passageway 604 is generally higher than the air pressure outside the casing 608. The resulting pressure differentials between the air outside of the casing 608 and the air inside the casing near the end of the outlet diffusion isolation tube 638 causes part of the air flow 624 to enter the outlet diffusion isolation tube 638. The air flow 626 into the outlet diffusion isolation tube 638 passes through the casing 608 through the air outlet opening 632. The expelled air flow 628 then enters the ambient air outside of the casing 608. When the synthetic air jet 602 is deactivated, the rate of diffusion of air through the ventilation openings 630, 632 is reduced to optimum low levels.

Sixth Embodiment of the Present Invention

Figure 13:
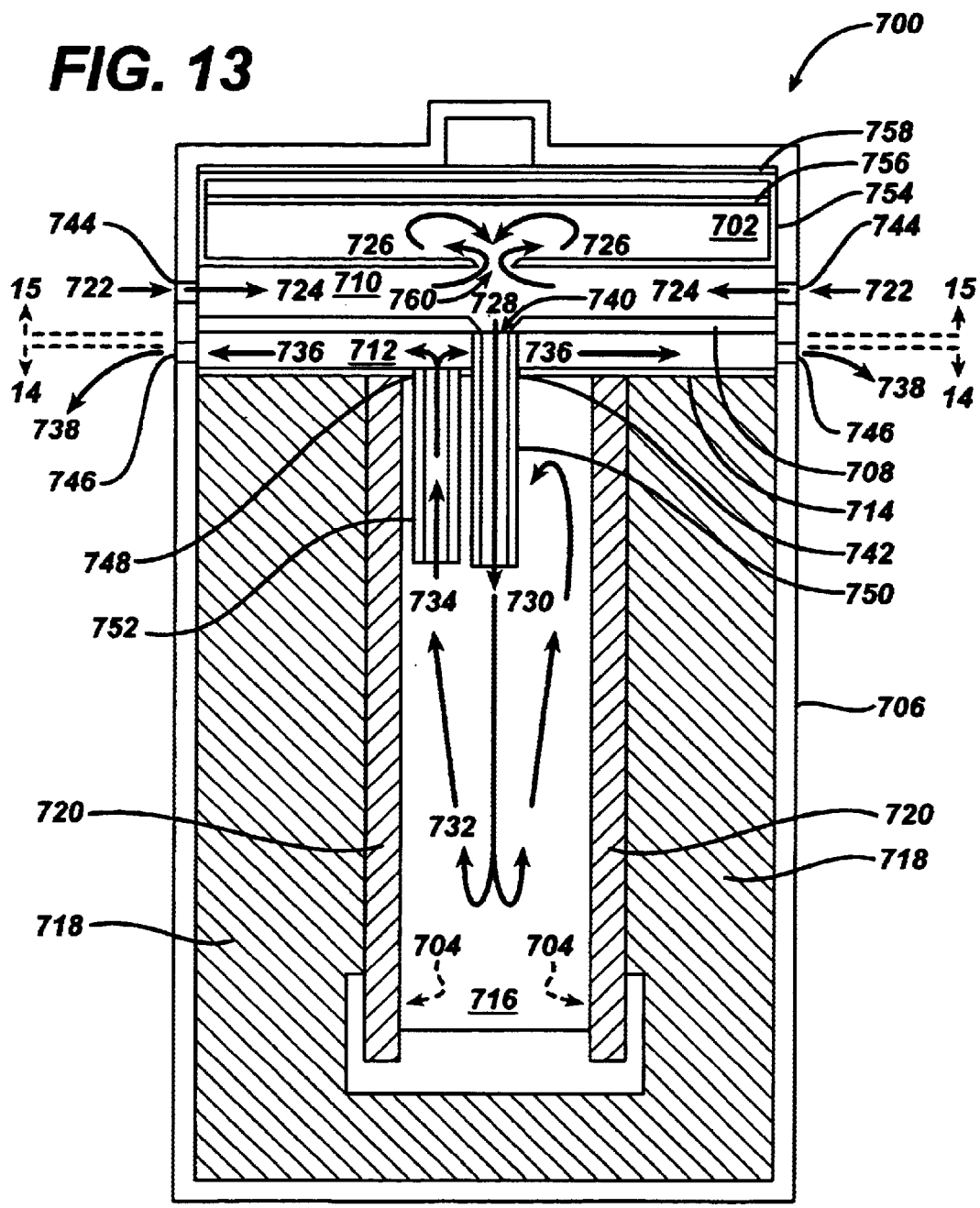
FIG. 13 is a diagrammatic axial cross-sectional view of a sixth embodiment according to the present invention.
Figure 14:
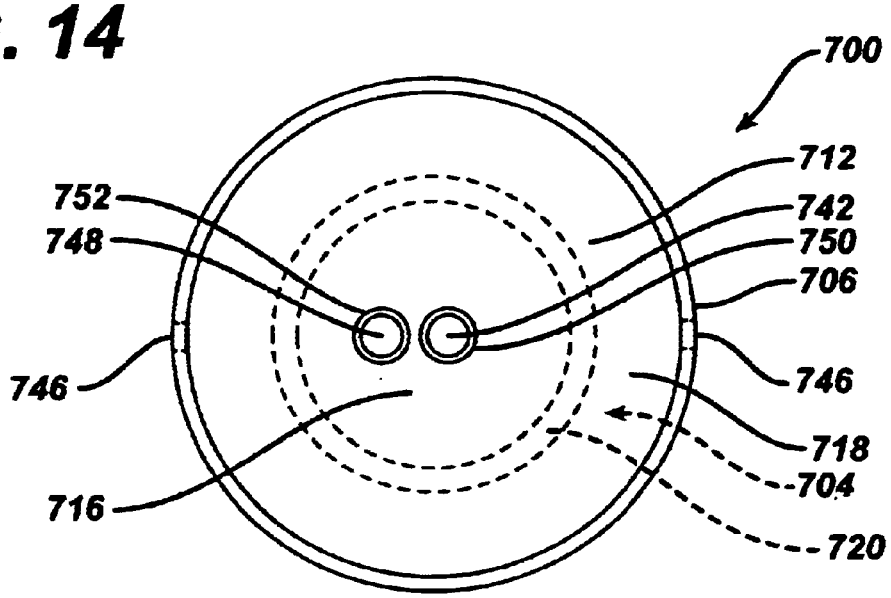
FIG. 14 is a radial cross-sectional view of the battery shown in FIG. 13 taken along line 14—14.
Figure 15:
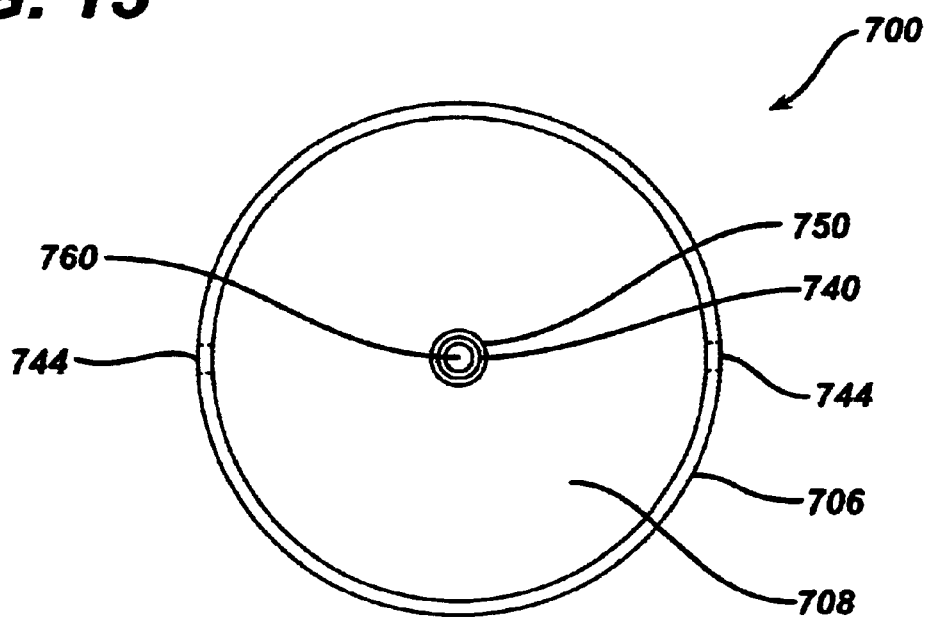
FIG. 15 is a radial cross-sectional view of the battery shown in FIG. 13 taken along line 15—15.

A sixth embodiment of a battery 700 embodying the present invention is shown in FIGS. 13–15. FIG. 13 illustrates a cylindrical battery 700 with a synthetic air jet 702. FIG. 14 illustrates a radial cross-section of the battery 700 shown in FIG. 13. FIG. 15 illustrates a radial cross-section of the battery 700 shown in FIG. 13.

A synthetic air jet 702 and one metal-air cell 704 are enclosed within a conductive cylindrical casing 706. An air stream isolator 708 separates the upper portion of the interior of the casing 706 into an upper air chamber or passageway 710 and a lower air chamber or passageway 712. A solid barrier 714 separates the lower air passageway from an axial air plenum 716. The metal-air cell 704 is composed of an anode material 718 in contact with the casing 706 and a cylindrical air cathode 720 (with separators (not shown) between the anode and the cathode). The air cathode 720 of the metal-air cell 704 is positioned to be adjacent to and facing the axial air plenum 716. The opposing side of the air cathode 720 faces the anode 718 material. The synthetic air jet 702 is positioned in the upper part of the casing 706 adjacent to the upper air chamber or passageway 710. The arrows 722–738 represent a typical circulation of air flow or gases into, within, and out of a casing 706 to provide reactant air flow 730 to the air cathode 720.

The synthetic air jet 702 is located above the upper air chamber or passageway 710. The air stream isolator 708 has an opening 740 to permit air flow 728 from the synthetic air jet 702 to pass to an opening in the solid barrier 714. The solid barrier 714 has a single inlet opening 742 or inlet portal to permit air flow from the synthetic air jet 702 to enter the axial air plenum 716.

The casing 706 isolates the metal-air cell 704 from the ambient air with the exception of a plurality of ventilation openings 744, 746. Preferably, two air inlet openings 744 and two air outlet openings 746 permit the ambient air to communicate with the upper air chamber or passageway 710 and lower air chamber or passageway 712 of the battery 700 respectively. The inlet air openings 744 through the casing 706 are located on the sides of the casing 706, and the outlet air openings 742 through the casing 706 are located on the sides of the battery 700.

Air supply for the synthetic air jet 702 comes from the inlets 744. As described previously, the number of ventilation openings 744, 746 is not as important as the aggregate size of the ventilation openings 744, 746 in connection with the shape of the ventilation openings 744, 746. The inlet air openings 744 and the outlet air openings 746 are of sufficient size to admit a quantity of air into the casing 706 dependent upon the metal-air cell's 704 power requirements.

Preferably, the single inlet opening 742 or inlet portal and a single outlet portal 748 in the solid barrier 714 permit air to communicate with the axial air plenum 716 of the battery 700. The single inlet opening 742 or inlet portal and the outlet portal 748 are located at the top of the axial air plenum 716. Similar to the ventilation openings 744, 746, the number of inlet openings 742 or inlet portals and outlet portals 748 in the solid barrier 714 is not as important as the aggregate size of the inlet openings 742 or inlet portals and outlet portals 748 in connection with the shape of the inlet openings 742 or inlet portals and outlet portals 748.

An inlet diffusion isolation tube 750 connects to the opening 740 in the air stream separator 708, and extends from the air stream separator 708 through the inlet opening 742 or portal and into the axial air plenum 716 of the battery 700. As described previously, the size, number, shape, or arrangement of inlet diffusion isolation tubes 750 associated with one or more of the openings 740 may vary to optimize the air flow and isolation needs of any particular metal-air cell 704.

An outlet diffusion isolation tube 752 connects to the outlet portal 748, and extends from the outlet portal 748 towards the axial air plenum 716 of the battery 700. Parameters for determining the size, number, shape, and configuration of outlet portal 748 sizes and their corresponding outlet diffusion isolation tubes 752 have been previously discussed.

The synthetic air jet 702 provides convective air flow into the axial air plenum 716 and circulation adjacent to the air cathode 720. Similar to the units previously described in FIGS. 2–12, the synthetic air jet 702 can comprise a housing 754 with a flexible diaphragm 756 incorporated into the housing 754. For example, the flexible diaphragm can be a speaker or similar type of device for responding to a signal, wave, or force. The diaphragm 756 operates to change the internal volume of the synthetic air jet housing 754. The synthetic air jet 702 can be configured into many different shapes and designs to generate an air flow through the battery 700.

A means for changing the internal volume of the synthetic air jet housing 754 to activate a synthetic air jet 702 provides control over the air flow through the battery 700 generated by the synthetic air jet 702. For example, a means for changing the internal volume of the synthetic air jet housing to activate a synthetic air jet 702 can be a square wave generator circuit board 758 configured to vibrate the flexible diaphragm 756 or speaker incorporated into the synthetic air jet housing 754. A means for changing the internal volume of the synthetic air jet housing 754 to activate a synthetic air jet 702 can be a piezoelectric transducer, a sinusoidal drive transducer, a thermostatic actuator, a thermoelectrical actuator, a thermopneumatic actuator, a shape memory alloy, any magnetic method, or any other drive or actuator used in conjunction with a diaphragm, piston, or any other movable structure that can be incorporated into the synthetic air jet housing 754.

When the synthetic air jet 702 is activated by the square wave generator circuit board 758, ambient air is drawn into the air inlet openings 744. The inlet air flow 722 drawn through the air inlet openings 744 enters the upper air chamber or passageway 710. At least part of the air flow 724 is drawn in around the periphery of an opening 760 in the housing 754 of the synthetic air jet 702. The air 726 in the synthetic air jet 702 circulates inside the housing 754 until the synthetic air jet 702 expels the air 726 out through the opening 760. The air 728 travels through the upper air chamber or passageway 710 and through the opening 740 in the air stream separator 708 into the inlet diffusion isolation tube 750. The air 728 flows within the inlet diffusion isolation tube 750 through the inlet opening 742 in the solid barrier 714 and then into the axial air plenum 716 to provide reactant air 732 for the air cathode 720.

Pressure differentials between the exterior of the casing 706 and the interior of the casing 706 will cause an air flow 722–738 through the battery 700. For example, when the synthetic air jet 702 is activated to create the air flow 722–738 shown by the arrows in FIG. 13, the air pressure in the interior of the casing 706 near the inlet air openings 744 is generally lower than the air pressure outside the casing 706. As a result, ambient air is drawn into the battery 700 through the air inlet openings 744, into the synthetic air jet 702, and into the axial air plenum 716 through the inlet diffusion isolation tube 750. The air flow 732 in the axial air plenum 716 supplies reactant air 732 to the air cathode 720. As the synthetic air jet 702 expels an air flow 728 through the opening 740 in the air stream separator 708 and into the axial air plenum 716, the air pressure within the casing 706 through the center of the axial air plenum 716 is generally higher than the air pressure outside the casing 706. The resulting pressure differentials between the air outside of the casing 706 and the air inside the casing 706 near the end of the outlet diffusion isolation tube 752 causes part of the air flow 734 to enter the outlet diffusion isolation tube 752. The air flow 734 into the outlet diffusion isolation tube 752 passes into the lower air chamber or passageway 712, and then through the casing 706 by way of the air outlet opening 746. The expelled air flow 736 then enters the ambient air outside of the casing 706. When the synthetic air jet 702 is deactivated, the rate of diffusion of air through the tubes 750, 752 is reduced by their structure to isolate the air cathode 720 in the manner described above.

In view of the foregoing, it will be appreciated that the invention provides a synthetic air jet for a metal-air cell battery. A synthetic air jet for a metal-air battery provides an air moving device that occupies less volume than conventional air movers. Further, a synthetic air jet for a metal-air battery is usable with advanced systems for isolating air electrodes. A synthetic air jet for a metal-air battery does not require a complex baffle system for distributing air throughout the cathode air plenum. And, a synthetic air jet for a metal-air battery is quiet, needs relatively simple controls, and consumes power at a relatively low rate. It will be understood that the preferred embodiment has been disclosed by way of example, and that other modifications may occur to those skilled in the art without departing from the scope and spirit of the appended claims.

The invention claimed is:

1. An enclosure for at least one electrochemical cell having at least one air electrode, the enclosure comprising:
    a casing defining at least one inlet and at least one outlet communicating with the exterior of the casing;
    a synthetic jet defining a housing with an internal cavity and an opening communicating with the air inside the casing; and
    a movable member positioned to change the internal volume of the housing,
    wherein the opening is positioned relative to the inlet and the outlet so that, in response to said change, the synthetic jet is operative to forcibly admit exterior air through the inlet into the casing and through the opening into the housing, to forcibly expel air from the housing through the opening into the casing, and then to expel air from the casing through the outlet to the exterior of the casing, so that a reactant air flow-path is defined within the casing, with the flow-path extending into the casing through the inlet and out of the casing through the outlet.

2. The enclosure of claim 1, wherein the inlet comprises at least one diffusion isolation tube.

3. The enclosure of claim 1, wherein the outlet comprises at least one diffusion isolation tube.

4. The enclosure of claim 1, wherein the movable member comprises metal.

5. The enclosure of claim 4 further comprising an electrode to attract or repel the movable member.

6. The enclosure of claim 1, wherein the movable member is a piston.

7. The enclosure of claim 1, wherein the movable member is a diaphragm.

8. The enclosure of claim 1, wherein the casing is a prismatic shape defining a bottom, a top, and at least one sidewall.

9. The enclosure of claim 8, wherein the opening in the housing of the synthetic jet is positioned to expel air towards the outlet in the casing.

10. The enclosure of claim 1, wherein the casing is a cylindrical shape defining a top, a bottom, and a sidewall.

11. The enclosure of claim 10, wherein the opening in the housing of the synthetic jet is positioned to expel air towards the outlet, which is positioned in the top of the casing.

12. The enclosure of claim 11, wherein the movable member is further configured to forcibly move the air from the inlet, which is positioned in the sidewall of the casing.

13. The enclosure of claim 1, wherein the interior of the casing is divided into a first plenum and a second plenum by a baffle plate.

14. The enclosure of claim 13, wherein the interior of the casing is configured such that air is forcibly moved by the movable member from the inlet to the first plenum.

15. The enclosure of claim 14, wherein the baffle plate comprises an opening through which air is forcibly moved by the movable member from the first plenum to the second plenum.

16. The enclosure of claim 15, wherein the interior of the casing is configured such that air is forcibly moved by the movable member from the second plenum to the opening in the housing.

17. The enclosure of claim 16, wherein the interior of the casing is configured so that air is forcibly moved by the movable member from the opening in the housing of the synthetic jet to the outlet in the casing.

18. The enclosure of claim 1, further comprising means for activating the synthetic jet.

19. The enclosure of claim 18, wherein the inlet comprises at least one diffusion isolation tube.

20. The enclosure of claim 18, wherein the outlet comprises at least one diffusion isolation tube.

21. The enclosure of claim 18, wherein the movable member comprises metal.

22. The enclosure of claim 21, wherein the means for activating the synthetic jet comprises an electrode positioned to attract or repel the movable member.

23. The enclosure of claim 18, wherein the movable member is a piston.

24. The enclosure of claim 18, wherein the movable member is a diaphragm.

25. The enclosure of claim 18, wherein the casing is a prismatic shape defining a bottom, a top, and at least one sidewall.

26. The enclosure of claim 18, wherein the casing is a cylindrical shape defining a top, a bottom, and a sidewall.

27. The enclosure of claim 18, wherein the interior of the casing is divided into a first plenum and a second plenum by a baffle plate.

28. The enclosure of claim 27, wherein the interior of the casing is configured so that air is forcibly moved by the movable member from the inlet in which is positioned in the sidewall to the first plenum.

29. The enclosure of claim 28, wherein the baffle plate comprises an opening through which air is forcibly moved by the movable member from the first plenum to the second plenum.

30. The enclosure of claim 29, wherein the interior of the casing is configured so that air is forcibly moved by the movable member from the second plenum to the opening in the housing.

31. The enclosure of claim 30, wherein the interior of the casing is configured so that air is forcibly moved by the movable member from the housing of the synthetic jet to the outlet in the casing.

32. The enclosure of claim 1, wherein an air plenum is within the casing to receive air from the synthetic jet and the opening is positioned relative to the inlet and the outlet so that, in response to said change, the synthetic jet is operative to forcibly expel air from the housing through the opening into the casing and into the air plenum, and then to expel air from the air plenum through the outlet to the exterior of the casing.

33. The enclosure of claim 32, wherein the casing is a cylindrical shape defining a top end, a bottom end, and a sidewall.

34. The enclosure of claim 33, wherein the inlet and outlet are positioned on the sidewall.

35. The enclosure of claim 32, wherein the inlet and outlet are positioned on opposing ends of the casing.

36. The enclosure of claim 32, wherein said casing defines a first interior chamber including the inlet and a second interior chamber including the outlet, and wherein said air plenum defines an inlet portal in communication with the first interior chamber and an outlet portal in communication with the second interior chamber.

37. The enclosure of claim 36, wherein the inlet portal comprises at least one diffusion isolation tube, and the outlet portal comprises at least one diffusion isolation tube.

38. The enclosure of claim 36, wherein the opening of the synthetic jet is positioned to expel air towards the inlet portal of the air plenum.

39. The enclosure of claim 32, wherein the air plenum is annular.

40. The enclosure of claim 32, wherein the air plenum is cylindrical.

41. A method for providing air flow with a synthetic jet to an enclosure for an electrochemical cell having at least one air electrode, comprising:

enclosing the synthetic jet in a casing defining at least one inlet and at least one outlet, wherein the synthetic jet can receive air through the inlet from the exterior of the casing, and the synthetic jet defining a housing with an internal cavity and an opening communicating with the air inside the casing; and activating the synthetic jet to forcibly admit exterior air through the inlet into the casing and through the opening into the housing, to forcibly expel air from the housing through the opening into the casing, and then to expel air from the casing through the outlet to the exterior of the casing, so that a reactant air flow-path is defined within the casing, with the flow-path extending into the casing through the inlet and out of the casing through the outlet.

42. The method of claim 41, wherein the step of activating the synthetic jet comprises energizing an electrode to attract or repel a movable member of the synthetic jet.

43. The method of claim 41, wherein the step of activating the synthetic jet comprises actuating a movable member of the synthetic jet.

44. An enclosure for an electrochemical cell having at least one air electrode, the enclosure comprising:

a casing defining at least one inlet and at least one outlet communicating with the exterior of the casing;

an air stream separator defining an upper chamber, a lower chamber within the casing, and an air stream separator opening, wherein the upper chamber receives air from the inlet;

a synthetic jet defining a housing with an internal cavity and an opening communicating with the air inside the upper chamber;

a solid barrier defining an axial plenum with at least one inlet portal and at least one outlet portal, wherein the axial plenum receives air from the synthetic jet through the inlet portal to provide reactant air to the axial plenum, and the lower chamber receives air through the outlet portal from the axial plenum; and a movable member positioned to change the internal volume of the housing to admit exterior air through the inlet into the casing and through the opening into the housing, to expel air from the housing through the opening into the upper chamber and into the axial plenum, and then to expel air from the axial plenum through the lower chamber and the outlet to the exterior of the casing.

45. The enclosure of claim 44, wherein the inlet portal comprises at least one diffusion isolation tube, and the outlet portal comprises at least one diffusion isolation tube.

46. The enclosure of claim 44, wherein the movable member is a diaphragm.

47. The enclosure of claim 44, further comprising a circuit board for generating a wave to vibrate the movable member.

48. An enclosure for at least one electrochemical cell having at least one air electrode, the enclosure comprising:

a casing defining at least one inlet and at least one outlet communicating with the exterior of said casing, wherein the interior of said casing is divided into a first plenum and a second plenum by a baffle plate defining one or more apertures;

a synthetic jet defining a housing with an internal cavity and an opening communicating with air inside said casing; and a movable member positioned to effect a change in the internal volume of said housing, wherein said opening is positioned relative to said inlet and said outlet such that, in response to said change, the synthetic jet is operative to forcibly admit air through said inlet into said casing to said first plenum, to forcibly expel air from said first plenum to said second plenum through said one or more apertures, to forcibly expel air from said second plenum to said opening into said housing, and to forcibly expel air from said opening in said housing through said outlet to the exterior of said casing.

49. The enclosure of claim 48, further comprising means for activating said synthetic jet.

50. An enclosure for at least one electrochemical cell having at least one air electrode, the enclosure comprising:
- a casing defining at least inlet and at least one outlet communicating with the exterior of the casing, wherein the inlet comprises at least one diffusion isolation tube;
- a synthetic jet defining a housing with an internal cavity and an opening communicating with air inside the casing; and
- a movable member positioned to change the internal volume of the housing to admit exterior air through the inlet into the casing and through the opening into the housing, to expel air from the housing through the opening into the casing, and then to expel air from the casing through the outlet to the exterior of the casing.

51. The enclosure of claim 50, wherein the outlet comprises at least one diffusion isolation tube.

* * * * *